United States Patent
Robinson

(10) Patent No.: US 11,050,604 B2
(45) Date of Patent: Jun. 29, 2021

(54) SYSTEMS, METHODS AND APPARATUSES FOR MODULATION-AGNOSTIC UNITARY BRAID DIVISION MULTIPLEXING SIGNAL TRANSFORMATION

(71) Applicant: Rampart Communications, Inc., Annapolis, MD (US)

(72) Inventor: Matthew Brandon Robinson, Crownsville, MD (US)

(73) Assignee: Rampart Communications, Inc., Annapolis, MD (US)

( * ) Notice: Subject to any disclaimer, the term of this patent is extended or adjusted under 35 U.S.C. 154(b) by 0 days.

(21) Appl. No.: 16/889,324

(22) Filed: Jun. 1, 2020

(65) Prior Publication Data
US 2021/0006451 A1 Jan. 7, 2021

Related U.S. Application Data

(63) Continuation-in-part of application No. 16/459,245, filed on Jul. 1, 2019.

(51) Int. Cl.
*H04L 27/34* (2006.01)
*H04L 1/00* (2006.01)
*H04L 27/00* (2006.01)

(52) U.S. Cl.
CPC ........ *H04L 27/3488* (2013.01); *H04L 1/0003* (2013.01); *H04L 1/0041* (2013.01);
(Continued)

(58) Field of Classification Search
CPC ............. H04L 27/3488; H04L 27/0008; H04L 27/3405; H04L 1/0003; H04L 1/0071; H04L 1/0041
See application file for complete search history.

(56) References Cited

U.S. PATENT DOCUMENTS 5,237,587 A 8/1993 Schoolcraft
5,345,599 A 9/1994 Paulraj et al.
(Continued)

FOREIGN PATENT DOCUMENTS

CN 1813435 A 8/2006
CN 101179539 A 5/2008
(Continued)

OTHER PUBLICATIONS

International Search Report and Written Opinion for PCT Application No. PCT/US2017/061489, dated Feb. 26, 2018, 8 pages.
(Continued)

*Primary Examiner* — Dac V Ha
(74) *Attorney, Agent, or Firm* — Cooley LLP

(57) ABSTRACT

A method includes selecting a block size, via a processor of a communications system, and identifying a set of constellation points of a constellation diagram, based on a received set of bits and the constellation diagram. The constellation diagram is associated with a modulation scheme. A set of symbol blocks, based on the set of constellation points, is generated. Each symbol block from the set of symbol blocks has a size equal to the block size and includes a subset of constellation points from the set of constellation points. A unitary braid division multiplexing (UBDM) transformation is applied to each symbol block from the set of symbol blocks to produce a set of complex numbers. The set of complex numbers is then sent via the processor.

22 Claims, 12 Drawing Sheets

(52) U.S. Cl.
CPC ........ *H04L 1/0071* (2013.01); *H04L 27/0008* (2013.01); *H04L 27/3405* (2013.01)

(56) References Cited

U.S. PATENT DOCUMENTS

| | | |
|---|---|---|
| 5,555,268 A | 9/1996 | Fattouche et al. |
| 6,389,138 B1 | 5/2002 | Li et al. |
| 7,376,173 B2 | 5/2008 | Yedidia et al. |
| 7,454,084 B2 | 11/2008 | Faber et al. |
| 9,648,444 B2 | 5/2017 | Agee |
| 10,020,839 B2 | 7/2018 | Robinson et al. |
| 10,491,262 B2 | 11/2019 | Robinson et al. |
| 10,637,705 B1 | 4/2020 | Shattil |
| 10,735,062 B1 | 8/2020 | Robinson |
| 10,771,128 B1 | 9/2020 | Sitaram et al. |
| 10,819,387 B2 | 10/2020 | Robinson et al. |
| 10,833,749 B1 | 11/2020 | Robinson |
| 10,873,361 B2 | 12/2020 | Robinson |
| 2002/0009209 A1 | 1/2002 | Inoue et al. |
| 2003/0185309 A1 | 10/2003 | Pautler et al. |
| 2003/0210750 A1 | 11/2003 | Onggosanusi et al. |
| 2004/0059547 A1 | 3/2004 | Aftelak |
| 2004/0105489 A1 | 6/2004 | Kim et al. |
| 2004/0253986 A1 | 12/2004 | Hochwald et al. |
| 2006/0109897 A1 | 5/2006 | Guo et al. |
| 2006/0274825 A1 | 12/2006 | Ciofi et al. |
| 2007/0091999 A1 | 4/2007 | Nissan-Cohen et al. |
| 2007/0098063 A1 | 5/2007 | Reznic et al. |
| 2007/0115797 A1 | 5/2007 | Reznic et al. |
| 2009/0046801 A1 | 2/2009 | Pan et al. |
| 2009/0316802 A1 | 12/2009 | Tong et al. |
| 2010/0119001 A1 | 5/2010 | Walton et al. |
| 2010/0202553 A1 | 8/2010 | Kotecha et al. |
| 2010/0246656 A1* | 9/2010 | Hammerschmidt ... H04B 1/406 375/229 |
| 2010/0329393 A1 | 12/2010 | Higuchi |
| 2011/0134902 A1 | 6/2011 | Ko et al. |
| 2011/0235728 A1 | 9/2011 | Karabinis |
| 2012/0093090 A1 | 4/2012 | Han et al. |
| 2012/0257664 A1 | 10/2012 | Yue et al. |
| 2013/0064315 A1 | 3/2013 | Heath, Jr. et al. |
| 2013/0100965 A1 | 4/2013 | Ohmi et al. |
| 2013/0223548 A1 | 8/2013 | Kang et al. |
| 2014/0056332 A1 | 2/2014 | Soualle et al. |
| 2015/0003500 A1 | 1/2015 | Kesling et al. |
| 2015/0049713 A1 | 2/2015 | Lan et al. |
| 2015/0171982 A1 | 6/2015 | Wang et al. |
| 2015/0304130 A1* | 10/2015 | Logothetis ............ H04L 25/024 455/115.2 |
| 2016/0309396 A1 | 10/2016 | Chai et al. |
| 2016/0337156 A1 | 11/2016 | Milleth et al. |
| 2017/0180020 A1 | 6/2017 | Namgoong et al. |
| 2017/0237545 A1 | 8/2017 | Khandani |
| 2017/0288902 A1 | 10/2017 | Rusek et al. |
| 2017/0294946 A1 | 10/2017 | Wang et al. |
| 2017/0302415 A1 | 10/2017 | Park et al. |
| 2017/0331539 A1 | 11/2017 | Pham et al. |
| 2019/0075091 A1 | 3/2019 | Shattil et al. |
| 2019/0097694 A1 | 3/2019 | Jeon et al. |
| 2019/0158206 A1 | 5/2019 | Li et al. |
| 2019/0215222 A1* | 7/2019 | Cheng .................. H04L 27/38 |
| 2019/0268035 A1 | 8/2019 | Robinson et al. |
| 2019/0280719 A1* | 9/2019 | Yu ...................... H04L 5/0055 |
| 2019/0349042 A1 | 11/2019 | Ramireddy et al. |
| 2019/0349045 A1 | 11/2019 | Varatharaajan et al. |
| 2019/0379430 A1 | 12/2019 | Pekoz et al. |
| 2020/0014407 A1* | 1/2020 | Smith ................ H04L 25/4917 |
| 2020/0366333 A1 | 11/2020 | Robinson |
| 2021/0006288 A1 | 1/2021 | Robinson et al. |
| 2021/0006303 A1 | 1/2021 | Robinson |
| 2021/0006317 A1 | 1/2021 | Robinson |
| 2021/0006446 A1 | 1/2021 | Robinson |

FOREIGN PATENT DOCUMENTS

| | | |
|---|---|---|
| CN | 101795257 A | 8/2010 |
| CN | 103634065 A | 3/2014 |
| CN | 103716111 A | 4/2014 |
| EP | 1826915 A1 | 8/2007 |
| EP | 1883168 A2 | 1/2008 |
| EP | 3211812 A1 | 8/2017 |
| KR | 10-2010-0131373 A | 12/2010 |
| KR | 10-2013-0118525 A | 10/2013 |
| WO | WO 2008/024773 A2 | 2/2008 |
| WO | WO 2008/098225 A2 | 8/2008 |

OTHER PUBLICATIONS

Wu et al., "Practical Physical Layer Security Schemes for MIMO-OFDM Systems Using Precoding Matrix Indices," IEEE Journal on Selected Areas in Communications, Sep. 2013, vol. 31, Issue 9, pp. 1687-1700.

Huang et al., "Multi-dimensional encryption scheme based on physical layer for fading channel," IET Communications, Oct. 2018, vol. 12, Issue 19, pp. 2470-2477.

Huo and Gong, "A New Efficient Physical Layer OFDM Encryption Scheme," IEEE INFOCOM 2014, IEEE Conference on Computer Communications, pp. 1024-1032.

International Search Report and Written Opinion for International Application No. PCT/US2020/040393, dated Sep. 3, 2020, 12 pages.

Liu et al., "Piecewise Chaotic Permutation Method for Physical Layer Security in OFDM-PON," IEEE Photonics Technology Letters, Nov. 2016, vol. 28, No. 21, pp. 2359-2362.

Ericsson, "Signature design for NoMA," 3GPP TSG-RAN WG1 Meeting #93, Tdoc R1-1806241, Busan, South Korea, May 21-25, 2018, pp. 1-5.

International Search Report and Written Opinion for International Application No. PCT/US2020/039879, dated Oct. 9, 2020, 10 pages.

International Search Report and Written Opinion for International Application No. PCT/US2020/039606, dated Nov. 25, 2020, 18 pages.

International Search Report and Written Opinion for International Application No. PCT/US2020/043686, dated Dec. 3, 2020, 24 pages.

Invitation to Pay Additional Fees for International Application No. PCT/US2020/039606 dated Sep. 21, 2020, 12 pages.

Invitation to Pay Additional Fees for International Application No. PCT/US2020/043686 dated Oct. 7, 2020, 16 pages.

Invitation to Pay Additional Fees for International Application No. PCT/US2020/049031 dated Nov. 11, 2020, 13 pages.

Ma et al., "Secure Communication in TDS-OFDM System Using Constellation Rotation and Noise Insertion," IEEE Transactions on Consumer Electronics, Aug. 2010, vol. 56, No. 3, pp. 1328-1332.

Non-Final Office Action for U.S. Appl. No. 16/459,254 dated Nov. 5, 2020, 9 pages.

Huawei, "Initial Performance Evaluation of Multi-user MIMO Scheme for E-UTRA Downlink," 3GPP TSG RAN WG1, R1-051094, San Diego, USA, Oct. 10-14, 2005, 7 pages.

International Search Report and Written Opinion for International Application No. PCT/US2020/049031, dated Jan. 18, 2021, 20 pages.

International Search Report and Written Opinion for International Application No. PCT/US2020/051927, dated Jan. 15, 2021, 19 pages.

Sung et al., "M-PSK Codebook Based Clustered MIMO-OFDM SDMA with Efficient Codebook Search," IEEE, 2012, 5 pages.

Tseng et al., "Hardware Implementation of the Joint Precoding Sub-System and MIMO Detection Preprocessor in IEEE 802.11n/ac WLAN," Journal of Signal Processing Systems (2019) 91:875-884.

Xie et al., "Geometric Mean Decomposition Based Hybrid Precoding for Millimeter-Wave Massive MIMO," China Communications, May 2018, vol. 15, Issue 5, pp. 229-238.

Zhang et al., "A Novel Precoder Design for MIMO Multicasting with MMSE-DFE Receivers," IEEE, 2014, 5 pages.

(56) References Cited

OTHER PUBLICATIONS

Zheng et al., "Performance Comparison on the Different Codebook for SU/MU MIMO," IEEE 802.16 Broadband Wireless Access Working Group, IEEE C802.16m-08/1183r1, Sep. 12, 2008, pp. 1-9.

* cited by examiner

SYSTEMS, METHODS AND APPARATUSES FOR MODULATION-AGNOSTIC UNITARY BRAID DIVISION MULTIPLEXING SIGNAL TRANSFORMATION

CROSS-REFERENCE TO RELATED APPLICATIONS

This application is a Continuation-in-Part of U.S. patent application Ser. No. 16/459,245, filed Jul. 1, 2019 and titled "Systems, Methods and Apparatus for Secure and Efficient Wireless Communication of Signals Using a Generalized Approach Within Unitary Braid Division Multiplexing," the disclosure of which is herein incorporated by reference in its entirety for all purposes.

This application is related to U.S. Non-Provisional patent application Ser. No. 16/416,144, filed on May 17, 2019 and titled "COMMUNICATION SYSTEM AND METHODS USING MULTIPLE-IN-MULTIPLE-OUT (MIMO) ANTENNAS WITHIN UNITARY BRAID DIVISIONAL MULTIPLEXING (UBDM)," the disclosure of which is herein incorporated by reference in its entirety for all purposes.

STATEMENT REGARDING FEDERAL GOVERNMENT INTEREST

This United States Government holds a nonexclusive, irrevocable, royalty-free license in the invention with power to grant licenses for all United States Government purposes.

TECHNICAL FIELD

This description relates to systems and methods for transmitting wireless signals for electronic communications and, in particular, to systems and methods for securely transmitting signals using wireless communications.

BACKGROUND

In multiple access communications, multiple user devices transmit signals over a given communications channel to a receiver. These signals are superimposed, forming a combined signal that propagates over that channel. The receiver then performs a separation operation on the combined signal to recover one or more individual signals from the combined signal. For example, each user device may be a cell phone belonging to a different user and the receiver may be a cell tower. By separating signals transmitted by different user devices, the different user devices may share the same communications channel without interference.

A transmitter may transmit different symbols by varying a state of a carrier or subcarrier, such as by varying an amplitude, phase and/or frequency of the carrier. Each symbol may represent one or more bits. These symbols can each be mapped to a discrete value (complex number) in the complex plane, thus producing Quadrature Amplitude Modulation, or by assigning each symbol to a discrete frequency, producing Frequency Shift Keying. The symbols are then sampled at the Nyquist rate, which is at least twice the symbol transmission rate. The resulting signal is converted to analog through a digital to analog converter, and then translated up to the carrier frequency for transmission. When different user devices send symbols at the same time over the communications channel, the sine waves represented by those symbols are superimposed to form a combined signal that is received at the receiver.

Some known approaches to wireless signal communication include orthogonal frequency-division multiplexing (OFDM), which is a method of encoding digital data on multiple carrier frequencies. OFDM methods have been adapted to permit signal communications that cope with severe conditions of communication channels such as attenuation, interference, and frequency-selective fading. Such an approach, however, does not address a desire for a physical layer of security of signal transmission. Furthermore, the OFDM signal includes relatively smaller amplitudes over very large dynamic ranges typically resulting in the use of radio frequency (RF) amplifiers with high peak to average power ratio.

Thus, a need exists for improved systems, apparatuses and methods for a secure, power efficient approach to wireless communication of signals.

SUMMARY

In some embodiments, a method includes selecting a block size, via a processor of a communications system, and identifying a set of constellation points of a constellation diagram, based on a received set of bits and the constellation diagram. Identifying the set of constellation points can include mapping the received plurality of bits to the constellation diagram (e.g., using a gray code). The constellation diagram is associated with a modulation scheme. A set of symbol blocks, based on the set of constellation points, is generated. Each symbol block from the set of symbol blocks has a size equal to the block size and includes a subset of constellation points from the set of constellation points. A unitary braid division multiplexing (UBDM) transformation is applied to each symbol block from the set of symbol blocks to produce a set of complex numbers. The set of complex numbers is then sent via the processor.

The communications system can be configured to perform at least one of Quadrature Amplitude Modulation (QAM), Amplitude Phase Shift Keying (APSK) modulation, or Orthogonal Frequency-Division Multiplexing. In addition, the communications system can include one or more of: a wireless communication system, a wired communication system, or a fiber optic communication system.

In some embodiments, a method includes receiving, via a processor of a communications system, a plurality of input bits. The communications system can include one or more of: a wireless communication system, a wired communication system, or a fiber optic communication system. The method also includes converting the plurality of input bits into a plurality of complex numbers. Converting the plurality of input bits into a plurality of complex numbers includes performing bit-to-symbol mapping (e.g., using a gray code) based on the plurality of input bits and a constellation diagram, and applying a unitary braid division multiplexing (UBDM) transformation (e.g., including a plurality of nonlinear layers and a plurality of linear layers). The plurality of complex numbers is sent, via the processor and using a predetermined modulation technique, for subsequent processing (e.g., pulse shaping and/or the application of at least one filter). The predetermined modulation technique can include one or more of Quadrature Amplitude Modulation (QAM), Amplitude Phase Shift Keying (APSK) modulation, or Orthogonal Frequency-Division Multiplexing.

In some embodiments, a method for modulation-agnostic UBDM signal transformation includes receiving a plurality of input bits, and mapping each input bit from the plurality of input bits to a constellation using a bit-to-symbol map to identify a plurality of symbols. The constellation can be a constellation of a constellation diagram for a signal to be transmitted wirelessly, or through wired or fiber optic communication. The constellation diagram can be associated with a specific modulation scheme. Subsets of symbols from the plurality of symbols are grouped into a plurality of blocks, each block from the plurality of blocks having a size N. A UBDM transformation is applied to each block from the plurality of blocks to produce a plurality of complex numbers, and the resulting complex numbers are sent, for example, to a downstream portion of the communication system for optional subsequent processing, e.g., including pulse shaping and/or filter application. After the optical downstream processing, a signal representing the complex numbers can be transmitted, (e.g., using the modulation scheme associated with the constellation diagram). The foregoing method can result in improved security and efficiency in the generation and/or transmission of the signal over a communication channel (which may be wired, wireless and/or optical fiber). In some such implementations, the method does not include the application of an inverse Fourier transform prior to sending the transmitted signal. Alternatively or in addition, the method does not include the generation of spreading codes.

DETAILED DESCRIPTION

Figure 1:
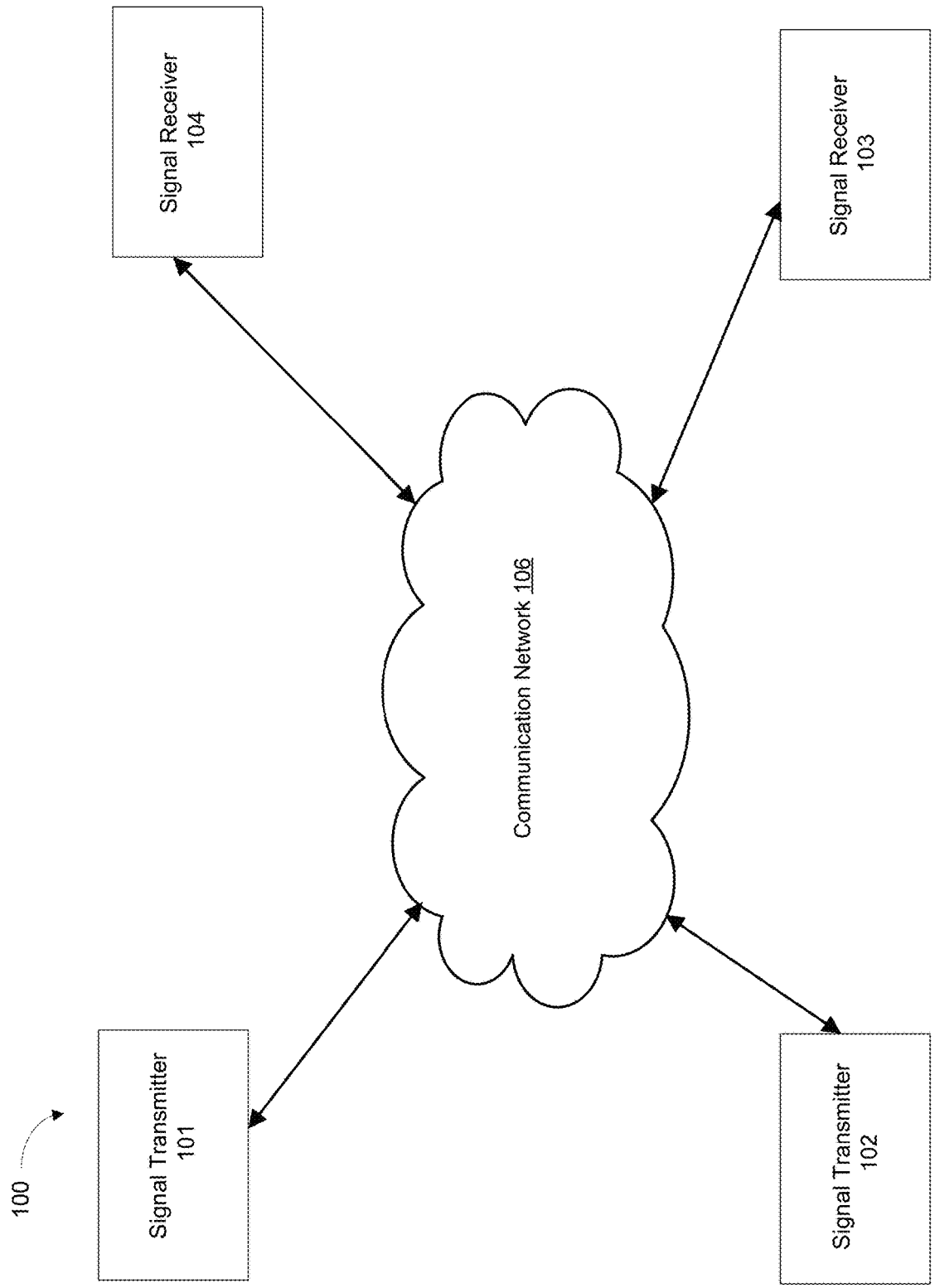
FIG. 1 is a schematic illustration of a secure and efficient generalized Unitary Braid Divisional Multiplexing (gUBDM) system, according to an embodiment.

In some embodiments, given a set of constellation points of a constellation diagram for a signal, a method performed by a system of the present disclosure includes applying a unitary braid division multiplexing (UBDM) transformation to each constellation point from the set of constellation points, in a manner that is not dependent on the modulation scheme or type of transmission that will be used for transmission of associated signals. In other words, the UBDM transformation is modulation-agnostic. The method can be used in wireless context as well as in wired or fiber optic contexts. The method can be compatible with any of a wide variety of modulation schemes, including straight digital modulation (e.g., Quadrature Amplitude Modulation (QAM), Amplitude Phase Shift Keying (APSK) modulation, or Orthogonal Frequency-Division Multiplexing). As used herein, a "constellation diagram" refers to a representation of a signal modulated by a digital modulation scheme. The constellation diagram displays the signal as a two-dimensional xy-plane scatter diagram in the complex plane at symbol sampling instants. The angle of a point, measured counterclockwise from the horizontal axis, represents the phase shift of the carrier wave from a reference phase. The distance of a point from the origin represents a measure of the amplitude or power of the signal.

In an example implementation, a digital point-to-point (PTP) microwave backhaul may be configured to send a direct 128-QAM constellation at a predetermined baud rate. The system is configured to receive a plurality of input bits, modulate each input bit from the plurality of input bits into the complex baseband values in the 128-QAM constellation using a bit-to-symbol mapping (e.g., a gray code) to produce a complex value, and send those complex values to another portion of the system for subsequent processing (e.g., pulse shaping, application of filters, etc.). To apply UBDM in this manner, a block size N on which to apply the UBDM transformation may first be selected. In some instances, such as OFDM, the block size N may be determined based on a number of data subcarriers, however the systems and methods set forth herein are not constrained by the modulation or transmission type, and as such, any desired block size N may be selected. The UBDM transform can be "inserted" into a given communications system in a similar manner, regardless of the block size N.

In some embodiments, a method for modulation-agnostic UBDM signal transformation includes receiving a plurality of input bits. Each input bit from the plurality of input bits is mapped to a constellation using a bit-to-symbol map to identify a plurality of symbols. The constellation can be a constellation of a constellation diagram for a signal to be transmitted wirelessly, or through wired or fiber optic communication. Subsets of symbols from the plurality of symbols are then grouped into a plurality of blocks ("symbol blocks"), each block from the plurality of blocks having a size N. A UBDM transformation (e.g., including a series of nonlinear layers and a series of linear layers, as described herein) is applied to each block from the plurality of blocks to produce a plurality of complex numbers, and the resulting complex numbers are sent to a downstream portion of the communication system for optional additional processing (e.g., pulse shaping, filter application, etc.). In some such embodiments, the method for modulation-agnostic UBDM signal transformation does not include the application of an inverse Fourier transform prior to transmitting the transmitted signal. Alternatively or in addition, the method for modulation-agnostic UBDM signal transformation does not include the generation of spreading codes. In some embodiments, the modulation-agnostic UBDM transformation is a generalized Unitary Braid Divisional Multiplexing system (gUBDM) transformation, as discussed below.

In some embodiments set forth herein, a generalized Unitary Braid Divisional Multiplexing system (gUBDM) includes a modified Orthogonal Frequency Divisional Multiplexing (OFDM) system. The modified OFDM system can include some components common to an unmodified OFDM system, but also includes a generalized version of an OFDM component (e.g., a subset of the functionality of the OFDM). The gUBDM system can be designed to implement (e.g., in hardware and/or software executed by or stored in hardware) a modified OFDM step during operation, to execute a paired operation including performing an inverse Fast Fourier Transform (iFFT) (or a Fast Fourier Transform FFT) of signals at a signal transmitter to generate transformed signals that are transmitted, and then performing a Fast Fourier Transform (FFT) (or an inverse Fourier Transform iFFT) on the transformed signals at a receiver to recover the signals. The modification includes generalizing the iFFT/FFT performed by the transmitter to an arbitrary transformation (represented by an arbitrary matrix, for example an arbitrary unitary matrix).

Embodiments of a gUBDM system, as described in further detail herein, and including embodiments with the above modification of an OFDM system, can impart exceptional security and efficiency in transmission of signal over wireless communication channels. Other benefits of embodiments of the gUBDM as described herein include an ability to use non-linear transformations, as well as a generalized implementation involving equiangular tight frame (ETF) transformations or nearly equiangular tight frame (NETF) transformations as an example. Standard OFDM doesn't allow for a generalization to ETF/NETF "overloading".

Generalizing to an arbitrary unitary as implemented in a gUBDM system as described herein can also have the effect of spreading the energy of each symbol or vector in a signal to be transmitted out across the different subcarriers. Spreading the energy of each symbol or vector in a signal to be transmitted can reduce the Peak-to-Average-Power-Ratio (PAPR) of the signal, and provide a degree of spreading (and, therefore, interference rejection) that is comparable to systems such as Direct Sequence Spread Spectrum (DSSS) systems. Spreading the energy of each symbol or vector in a signal to be transmitted can also provide an extra degree of freedom in multiplexing. In other words, in addition to standard frequency division multiplexing and time division multiplexing, a gUBDM system introduces code division multiplexing, which adds a powerful degree of freedom for multiplexing in a signal transmission system.

FIG. 1 is a schematic illustration of a secure and efficient, generalized Unitary Braid Divisional Multiplexing system 100, also referred to herein as a "gUBDM system" or "a system," according to an embodiment. The gUBDM 100 is configured to send and/or receive wireless electronic communications in a secure and efficient manner. The gUBDM system 100 includes signal transmitters 101 and 102, signal receivers 103 and 104, and a communication network 106, as illustrated in FIG. 1. The gUBDM system 100 is configured to process and transmit a signal from the signal transmitters 101 and 102 via one or more communication channels defined via the communication network to the signal receivers 103 and 104. Given a signal to be transmitted from a signal transmitter 101 and/or 102 and to a signal receiver 103 and/or 104, the gUBDM system 100 is configured such that the signal transmitter 101 and/or 102 can process the signal by applying an arbitrary transformation to generate a transformed signal that is transmitted to the signal receivers 103 and/or 104. The arbitrary transformation can be applied using one or more of hardware, software, a field-programmable gate array (FPGA), etc. The signal transmitters 101 and/or 102 also send to the signal receivers 103 and/or 104 (e.g., before transmitting the signal) an indication of the arbitrary transformation that was applied. The signal receivers 103 and/or 104 are configured to receive the transformed signal and the indication of the arbitrary transformation applied by the signal transmitter(s) and apply an inverse of the arbitrary transformation to recover the signal from the transformed signal. While the system 100 is illustrated to include two signal transmitters 101 and 102, and two signal receivers 103 and 104, a similar gUBDM system can include any number of signal transmitters and/or signal receivers.

In some embodiments, the communication network 106 (also referred to as "the network") can be any suitable communications network that includes one or more communication channels configured for wirelessly transferring data, operating over public and/or private networks. Although not shown, in some implementations, the signal transmitters 101,102 and signal receivers 103,104 (or portions thereof) can be configured to operate within, for example, a data center (e.g., a cloud computing environment), a computer system, one or more server/host devices, and/or so forth. In some implementations, the signal transmitters 101,102 and signal receivers 103,104 can function within various types of network environments that can include one or more devices and/or one or more server devices. For example, the network 106 can be or can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), a Bluetooth® network, a virtual network, and/or any combination thereof. In some instances, the communication network 106 can be a wireless network such as, for example, a Wi-Fi or wireless local area network ("WLAN"), a wireless wide area network ("WWAN"), and/or a cellular network. The communication network 106 can be, or can include a wireless network and/or wireless network implemented using, for example, gateway devices, bridges, switches, and/or so forth. The network 106 can include one or more segments and/or can have portions based on various protocols such as Internet Protocol (IP) and/or a proprietary protocol. The communication network 106 can include at least a portion of the Internet. In some instances, the communication network 106 can include multiple networks or subnetworks operatively coupled to one another by, for example, network bridges, routers, switches, gateways and/or the like (not shown).

Fast Unitary Transformations

One or more methods and systems described above usually involve a matrix operation on a vector. If the length of the vector is N and the size of the matrix is N×N (e.g., when the matrix is a unitary matrix), then the matrix operation on the vector involves $O(N^2)$ multiplications. Accordingly, as N increases, the computational burden on the telecommunication system can be prohibitive.

In some embodiments, some fast unitary transformations can be employed to reduce the calculation complexity. For example, the matrix operation on the vector can be achieved using Fourier matrix, Walsh-Hadamard matrix, Haar matrix, slant matrix, certain types of Toeplitz matrix, and certain types of circulant matrices that can be operated on a vector in a fast complexity class. These types of matrices, however, only form a limited class of transformations and therefore the resulting level of security may not be satisfactory.

To address the complexity issues while maintaining the security of the communication, one or more systems and methods described herein employ an approach to build an arbitrary unitary matrix up from smaller matrices. In this approach, unitary matrices are built up in layers. Each layer includes two operations. The first operation is a permutation and the second operation is a direct sum of U(2) matrices. Permutation matrices are unitary matrices that do not require any floating point operations and therefore are computationally free, i.e., with O(1) complexity. U(2) matrices are matrices where most of the values are 0, except the 2×2 blocks along the diagonal (also referred to as block-U(2) matrices). These block-U(2) matrices involve only 4×N/2=2×N multiplications. As a result, a layer including a block-U(2) involves 2×N multiplications for the block-U(2) and no multiplications for the permutation. In other words, one layer during construction of a unitary matrix has complexity O(N).

The total complexity of constructing a unitary matrix is the product of the number of layers and O(N) that is the complexity of each layer. In some embodiments, the total number of layers can be log(N), and the total complexity of all of the layers is therefore O(N×log(N)), which is equivalent to the complexity of a standard OFDM. In addition, log(N) layers of block-U(2) and permutation matrices can produce a dense unitary. While the space of fast unitary matrices is not as large as the full space of unitary matrices, it can still be sufficiently large to make an attack by an eavesdropper prohibitive.

In some embodiments, the approach described herein can employ block-U(m) matrices to build unitary matrices, where m is a positive integer (e.g., m=3, 4, 5, etc.). In some embodiments, matrices having different sizes can also be used within a single layer when constructing a unitary matrix. In some embodiments, different layers can use matrices having different sizes, e.g., a first layer uses block-U(m) matrices and a second layer uses block-U(l) matrices, where m is different from l. For example, if N=8, a set of four 2×2 block-U(2) matrices can be used in the first layer, followed by a permutation. Then two U(3) matrices and a single U(2) matrix can be used in the second layer, followed by another permutation. The third layer can include a block-U(2) matrix, a block-U(4) matrix, and then another block-U(2) matrix, followed by a third permutation.

In some embodiments, certain types of fast unitary matrices can also be written in terms of layers, each of which includes a permutation and a direct sum of blocks of smaller matrices. These types of matrices include, for example, Fourier matrices, Walsh-Hadamard matrices, Haar matrices, slant matrices, and Toeplitz matrices. In some embodiments, the unitary matrix that can be constructed using the layered approach includes any matrix that is not a direct sum of discrete Fourier matrices.

The layered approach described herein can be used in any situation that involves the construction of a unitary matrix. For example, the layered approach can be used by the initial vector generation manager 130 in the system 100 illustrated in FIG. 1 and described above.

Figure 2:
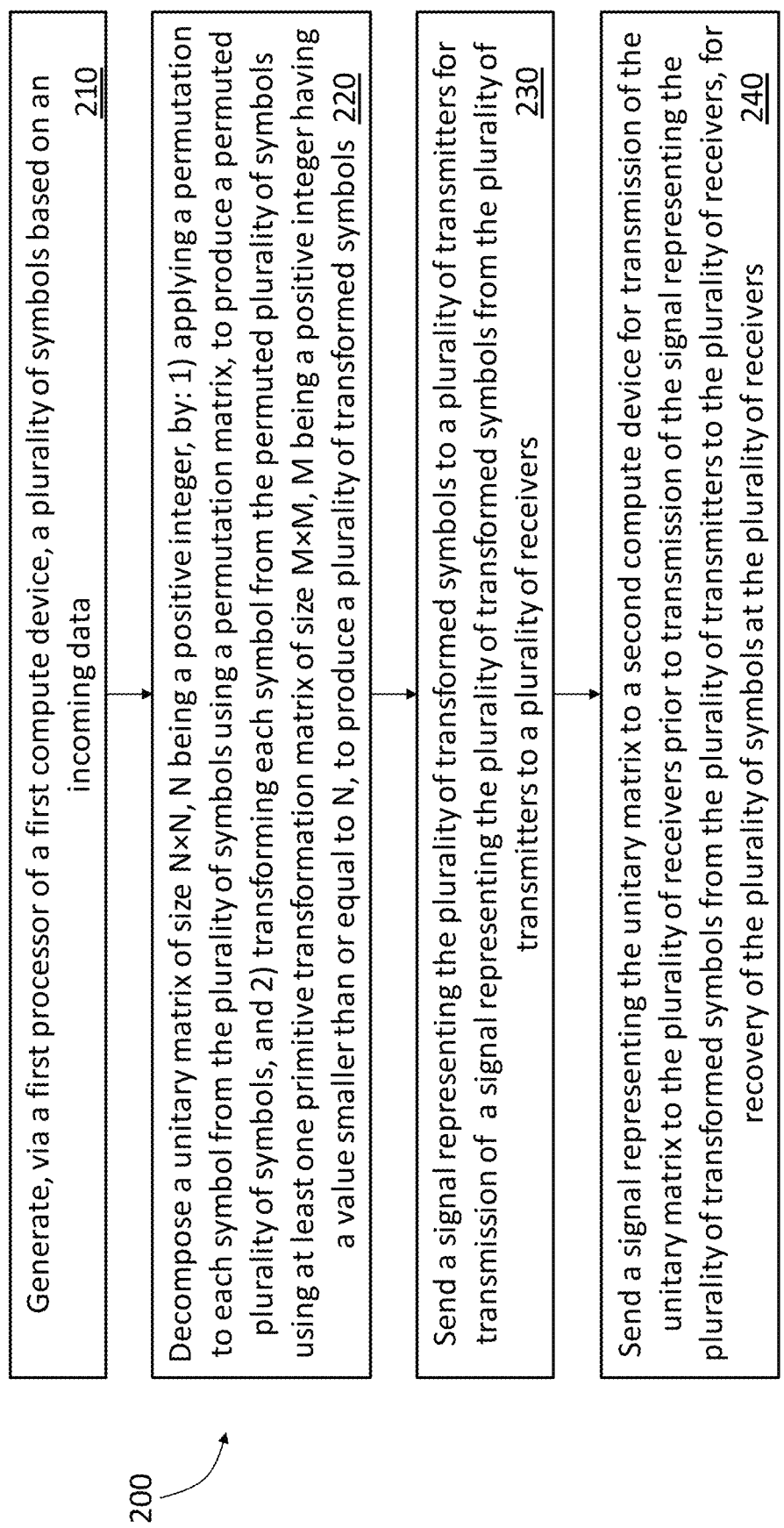
FIG. 2 is a flowchart illustrating a method of communication including a layered approach to build unitary matrices, according to an embodiment.

FIG. 2 is a flowchart illustrating a method 200 of communication including a layered approach to build unitary matrices, according to an embodiment. The method 200 includes, at 210, generating, via a first processor of a first compute device, a plurality of symbols based on an incoming data. At 220, a unitary matrix of size N×N is decomposed (where N is a positive integer). The decomposition includes: 1) applying a permutation to each symbol from the plurality of symbols using a permutation matrix, to produce a permuted plurality of symbols, and 2) transforming each symbol from the permuted plurality of symbols using at least one primitive transformation matrix of size M×M, where M is a positive integer having a value smaller than or equal to N. The result of step 2) is to produce a plurality of transformed symbols. In some embodiments, each primitive transformation matrix can include a block-U(M) matrix as described above.

The method 200 also includes, at 230, sending a signal representing the plurality of transformed symbols to a plurality of transmitters. The transmitters then transmit a signal representing the plurality of transformed symbols from the plurality of transmitters to a plurality of receivers. At 240, a signal representing the unitary matrix is sent to a second compute device for transmission of the unitary matrix to the plurality of receivers. In some embodiments, the unitary matrix can be transmitted to the receivers before the transmission of the signal representing the transformed symbols. The receivers can use the received unitary matrix for recovery of the symbols (i.e., symbols generated at 210).

In some embodiments, the decomposition of the unitary matrix at 220 can be achieved by multiple layers, each of which includes a permutation and a primitive transformation. For example, the first layer uses a first permutation matrix and a first primitive transformation matrix, and the second layer uses a second permutation matrix and a second primitive transformation matrix. In some embodiments, the total number of layers can be comparable to log(N), where N is the number of symbols generated at 210.

In some embodiments, the unitary matrix decomposed at 220 includes one of a Fourier matrix, a Walsh matrix, a Haar matrix, a slant matrix, or a Toeplitz matrix. In some embodiments, during the decomposition of the unitary matrix at 220, applying the permutation is not immediately followed by another permutation.

In some embodiments, the primitive transformation matrix has a dimension (e.g., a length) with a magnitude of 2, and the constructing the unitary matrix includes an iterative process that occurs $\log_2 N$ times. In some embodiments, other lengths can also be used for the primitive transformation matrix. For example, the primitive transformation matrix can have a length greater than 2 (e.g., 3, 4, 5, etc.). In some embodiments, the primitive transformation matrix includes a plurality of smaller matrices having diverse dimensions. For example, the primitive transformation matrix can include block-U(m) matrices, where m can be different values within a single layer or between different layers.

In some embodiments, the receiver used in the method 200 includes a plurality of antenna arrays. The plurality of receivers and the plurality of transmitters are configured to perform Multiple Input Multiple Output (MIMO) operations.

In some embodiments, a system for communication using layered construction of unitary matrices, according to an embodiment. The system includes a signal transmitter or a plurality of signal transmitters (e.g., numbered 1 to i) and a signal receiver or a plurality of signal receivers (e.g., numbered 1 to j), where i and j are both positive integers. In some embodiments, i and j can equal. In some other embodiments, i can be different from j. In some embodiments, the transmitters and the receivers are configured to perform Multiple Input Multiple Output (MIMO) operations.

In some embodiments, the transmitters can be substantially identical to the signal transmitter 301 illustrated in FIG. 3 and described below. In some embodiments, the receivers can be substantially identical to the signal receiver

Figure 4:
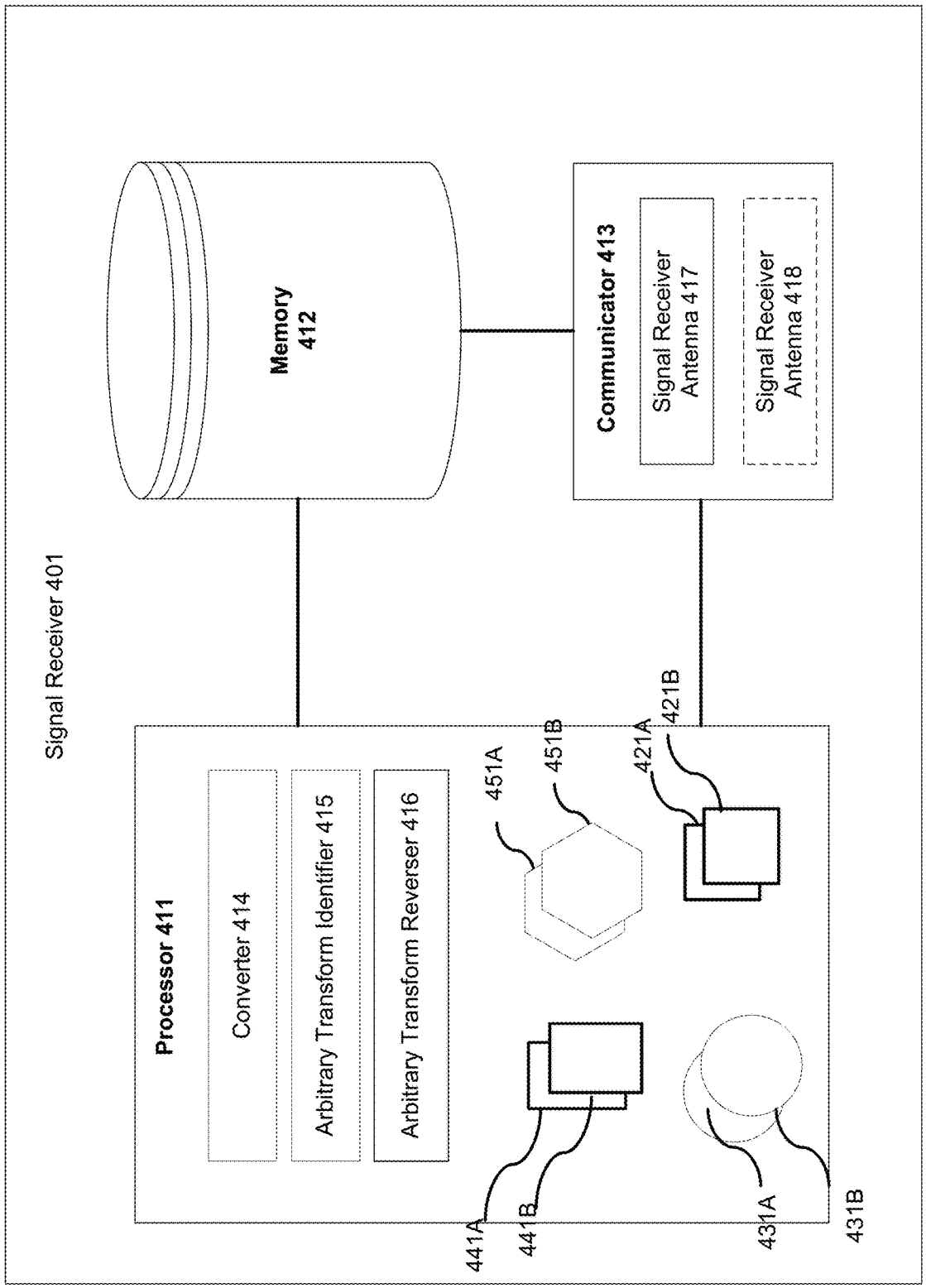
FIG. 4 is a schematic representation of a signal receiver within a gUBDM system, according to an embodiment

401 illustrated in FIG. 4 and described below. In some embodiments, each transmitter includes an antenna and the antennas of multiple transmitters can form an antenna array. In some embodiments, each receiver includes an antenna and the antennas of multiple receivers can also form an antenna array.

The system also includes a processor operably coupled to the signal transmitters. In some embodiments, the processor includes a single processor. In some embodiments, the processor includes a group of processors. In some embodiments, the processor can be included in one or more of the transmitters. In some embodiments, the processor can be separate from the transmitters. For example, the processor can be included in a compute device configured to process the incoming data and then direct the transmitters to transmit signals representing the incoming data.

The processor is configured to generate a plurality of symbols based on an incoming data and decompose a unitary transformation matrix of size N×N into a set of layers, where N is a positive integer. Each layer includes a permutation and at least one primitive transformation matrix of size M×M, where M is a positive integer smaller than or equal to N.

The processor is also configured to encode each symbol from the plurality of symbols using at least one layer from the set of layers to produce a plurality of transformed symbols. A signal representing the plurality of transformed symbols is then sent to the plurality of transmitters for transmission to the plurality of signal receivers. In some embodiments, each transmitter in the transmitters can communicate with any receiver in the receivers.

In some embodiments, the processor is further configured to send a signal representing one of: (1) the unitary transformation matrix, or (2) an inverse of the unitary transformation matrix, to the receivers, prior to transmission of the signal representing the transformed symbols to the signal receivers. This signal can be used to by the signal receivers to recover the symbols generated from the input data. In some embodiments, the unitary transformation matrix can be used for symbol recovery. In some embodiments, the recovery can be achieved by using the inverse of the unitary transformation matrix.

In some embodiments, the fast unitary transformation matrix includes one of a Fourier matrix, a Walsh matrix, a Haar matrix, a slant matrix, or a Toeplitz matrix. In some embodiments, the primitive transformation matrix has a dimension (e.g., a length) with a magnitude of 2 and the set of layers includes $\log_2 N$ layers. In some embodiments, any other length can be used as described above. In some embodiments, the signal receivers are configured to transmit a signal representing the plurality of transformed symbols to a target device.

Figure 3:
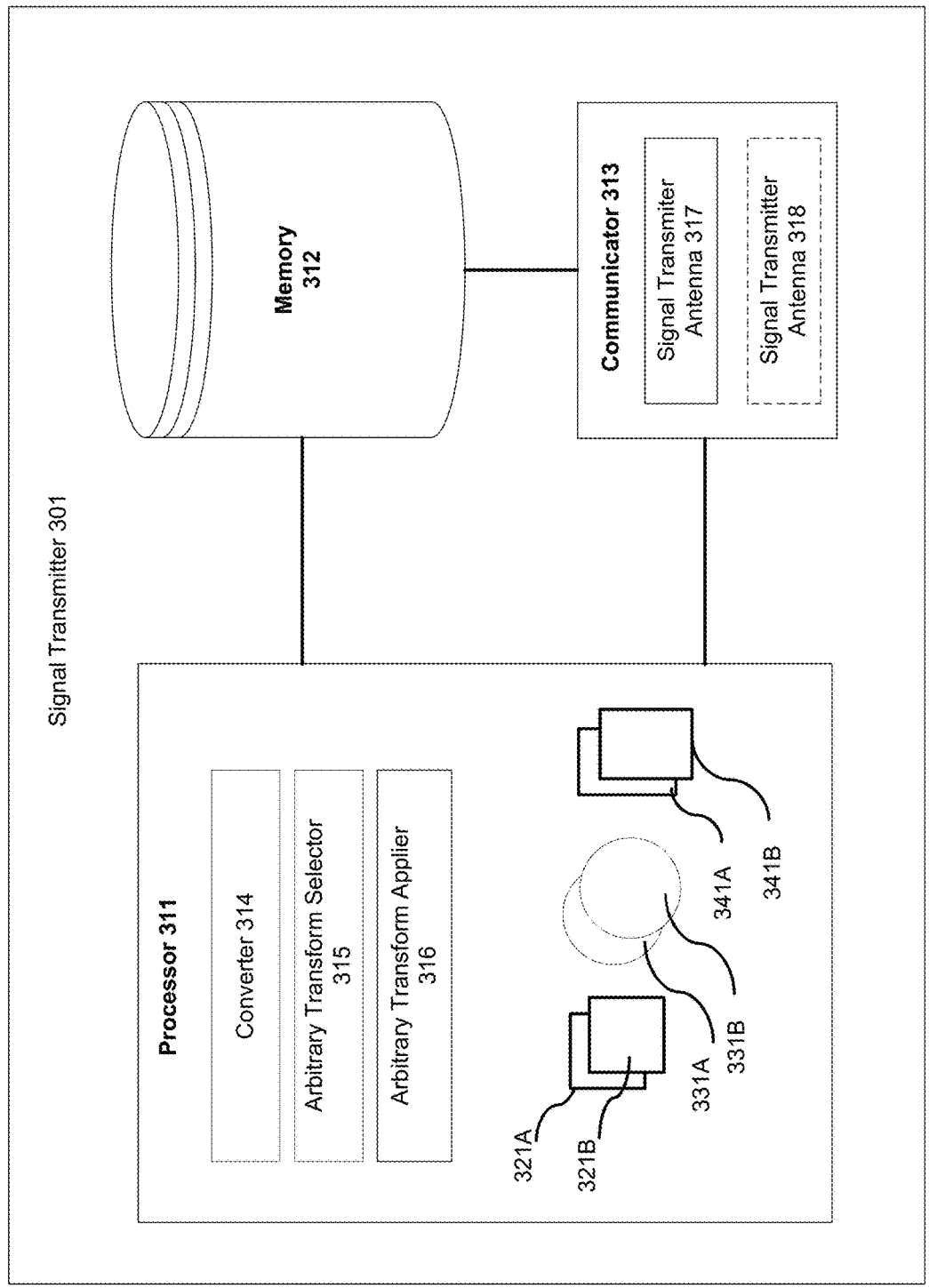
FIG. 3 is a schematic representation of a signal transmitter within a gUBDM system, according to an embodiment.

FIG. 3 is a schematic block diagram of an example signal transmitter 301 that can be a part of an gUBDM system such as the gUBDM system 100 described above with reference to FIG. 1, according to an embodiment. The signal transmitter 301 can be structurally and functionally similar to the signal transmitters 101,102 of the system 100 illustrated in FIG. 1. In some embodiments, the signal transmitter 301 can be, or can include, processors configured to process instructions stored in a memory The signal transmitter 301 can be a hardware-based computing device and/or a multimedia device, such as, for example, a server, a desktop compute device, a smartphone, a tablet, a wearable device, a laptop and/or the like. The signal transmitter 301 includes a processor 311, a memory 312 (e.g., including data storage), and a communicator 313.

The processor 311 can be, for example, a hardware based integrated circuit (IC) or any other suitable processing device configured to run and/or execute a set of instructions or code. For example, the processor 311 can be a general purpose processor, a central processing unit (CPU), an accelerated processing unit (APU), an application specific integrated circuit (ASIC), a digital signal processor (DSP), a field programmable gate array (FPGA), a programmable logic array (PLA), a complex programmable logic device (CPLD), a programmable logic controller (PLC) and/or the like. The processor 311 can be operatively coupled to the memory 312 through a system bus (for example, address bus, data bus and/or control bus).

The processor 311 can be configured to receive a signal to be transmitted and to perform processing to transform the signal into a transformed signal by applying an arbitrary transformation. In some implementations, the processor 311 can apply an arbitrary transformation that is defined to be a unitary transformation such that the transformed signal can be transmitted in a secure and efficient manner using the gUBDM system.

The processor 311 can include a set of components including a converter 314, an arbitrary transform selector 315, and an arbitrary transform applier 316. The processor 311 can receive a set of signals 321A, 321B, perform a set of arbitrary transformations 331A, 331B, and send a set of transformed signals 341A, 341B.

In some embodiments, each of the converter 314, an arbitrary transform selector 315, and an arbitrary transform applier 316 can be software stored in the memory 312 and executed by processor 311. For example, each of the above mentioned portions of the processor 311 can be code to cause the processor 311 to execute the converter 314, the arbitrary transform selector 315, and the arbitrary transform applier 316. The code can be stored in the memory 312 and/or a hardware-based device such as, for example, an ASIC, an FPGA, a CPLD, a PLA, a PLC and/or the like. In other embodiments, each of the converter 314, the arbitrary transform selector 315, and the arbitrary transform applier 316 can be hardware configured to perform the respective functions. In some embodiments, each of the components can a combination of software and hardware based. In some embodiments one or more of the components (e.g., converter 314, the arbitrary transform selector 315, the arbitrary transform applier 316) of the processor 311 can be configured to operate based on one or more platforms (e.g., one or more similar or different platforms) that can include one or more types of hardware, software, firmware, operating systems, runtime libraries, and/or so forth. In some implementations, the components of the signal transmitter can be configured to operate within a cluster of devices (e.g., a server farm). In such an implementation, the functionality and processing of the components of the signal transmitter 301 can be distributed to several devices of the cluster of devices. The components of the signal transmitter 301 and signal receiver 401 can be, or can include, any type of hardware and/or software configured to process attributes.

The converter 314 can be configured to receive a signal to be transmitted and prepare the signal in a form that can be transformed by the processor 311 using an arbitrary transformation. For example, in some embodiments, the processor 311 can receive a signal in the form of a serial set of symbols $b_n$. The converter 314 can be configured to perform a serial-to-parallel computation on the set of symbols $b_n$ to convert the serial set of symbols $b_n$ to a parallel set of symbols. In some embodiments, the converter 314 can generate a plurality of vectors (e.g., vectors 321A and 321B)

based on the set of symbols. In some implementations, the converter 314 can receive a signal in the form of a plurality of input bits. The converter 314 can be configured to generate a plurality of symbols based on the plurality of input bits. The converter 314 can be further configured to generate a plurality of blocks based on the plurality of symbols where each block from the plurality of blocks represents a vector from a plurality of vectors (e.g., vectors 321A, 321B). Alternatively, the converter 314 can be further configured to generate multiple pluralities of blocks based on the plurality of symbols where each plurality of blocks from the multiple pluralities of blocks represents a vector from a plurality of vectors (e.g., vectors 321A, 321B).

The arbitrary transform selector 315 can be configured to select, based at least partly on the signal to be transmitted or the plurality of vectors generated by the converter 314, an arbitrary transformation (e.g., arbitrary transformation 331A, 331B) to be applied on the plurality of vectors (e.g., vectors 321A, 321B) to securely and efficiently transmit the vectors from the signal transmitter 201 to one or more receivers associated with the gUBDM system. The arbitrary transformation (e.g., arbitrary transformation 331A, 331B) can include one of, or a combination of any of, a non-linear transformation, a unitary transformation, an ETF transformation, or a NETF transformation. In some embodiments, the arbitrary transform selector 315 can have access to a library of arbitrary transformations that are unitary by design (e.g., arbitrary transformation 331A, 331B) from which one can be selected for transmitting a signal. The arbitrary transform selector 315 can select the arbitrary transformation based, for example, on a transformation type and/or a criteria negotiated between two communicants via a telecommunications handshake or otherwise input by a participant in the communications system. The criteria can include, for example, one or more of: a desired security level, a latency threshold, an error rate threshold, a minimum data rate, a maximum data rate, etc. Notably, unitary transformation is the largest class of transformations that can be performed on a vector of symbols that leaves the total power of the signal unchanged. If a non-unitary transformation is used, then the inverse transformation at the receiver will necessarily amplify noise in some of the received symbols, whereas this is not the case of unitary transformations.

In some instances, the arbitrary transformation selector 315 can be configured to select a transformation that is not an identity matrix, a discrete Fourier matrix, or is any other direct sum of Fourier matrices. For example in some implementations the arbitrary transformations selector 315 can have a library of unitary transformations and based on a set of guidelines select one unitary transformation U and perform computations to check if U is an identity matrix, or a discrete Fourier matrix, or is any other direct sum of a set of Fourier matrices. If U is one of the three above categories, in some embodiments the arbitrary transform selector 315 can discard U and select another transformation that can meet the guideline of not being any of the above three categories. If the arbitrary transformation selector 315 picks a transformation U that is not an identity matrix, a discrete Fourier matrix, or is any other direct sum of Fourier matrices it can then assign U as the arbitrary transformation A to be used for an instance of transforming a signal to be transmitted using a gUBDM system according to that embodiment.

In some implementations, the arbitrary transform selector 315 can perform the selection based on a set of inputs received by the processor 311. In some implementations, the arbitrary transform selector 315 can perform the selection based on a set of parameters associated with the signal, the plurality of vectors, the nature of signal transmission (e.g., a security requirement, sensitivity of information content in the signal, path of signal transmission, etc.). In some implementations, the arbitrary transform selector 315 can be configured to define and generate an arbitrary transformation according a set of inputs received by the processor 311 (e.g., a set of user inputs received by the processor 311).

The arbitrary transform applier 316 can apply the selected arbitrary transformation on the plurality of vectors (e.g., vectors 321A, 321B) to generate a plurality of transformed vectors (e.g., transformed vectors 341A, 341B). In some implementations, the plurality of transformed vectors can have a total magnitude that substantially equals a total magnitude of the plurality of vectors.

The transformed vectors can then be sent to the signal transmitter antennas 317 and 318 included in the communicator 313 to be sent to one or more signal receivers associated with a signal receiver. In some implementations, for example, the arbitrary transform applier 316 can be configured to perform matrix operations to apply a transformation matrix A on a set of vectors to generate transformed vectors. In some implementations, the arbitrary transform applier 316 can be configured to perform any suitable number of procedures (e.g. signal processing procedures, suitable matrix operations) on a set of vectors before applying an arbitrary transformation.

While illustrated to include two signal transmitter antennas 317 and 318, as described above, a similar signal transmitter could include a single transmitter antenna according to some embodiments. A similar signal transmitter could include any suitable higher number of signal transmitter antennas (i.e., more than two transmitter antennas) according to still other embodiments. In some embodiments the signal transmitter 301 can include a plurality of antenna arrays configured to perform Multiple Input Multiple Output (MIMO) operations.

The memory 312 of the signal transmitter 301 can be, for example, a random access memory (RAM), a memory buffer, a hard drive, a read-only memory (ROM), an erasable programmable read-only memory (EPROM), and/or the like. The memory 312 can store, for example, one or more software modules and/or code that can include instructions to cause the processor 311 to perform one or more processes, functions, and/or the like (e.g., functions associated with the converter 314, the arbitrary transform selector 315, the arbitrary transform applier 316). In some embodiments, the memory 312 can include extendable storage units that can be added and used incrementally. In some implementations, the memory 312 can be a portable memory (for example, a flash drive, a portable hard disk, and/or the like) that can be operatively coupled to the processor 311. In other instances, a memory can be remotely operatively coupled with the signal transmitter 301. For example, a remote database server can serve as a memory and be operatively coupled to the signal transmitter 301.

The communicator 313 can be a hardware device operatively coupled to the processor 311 and memory 312 and/or software stored in the memory 312 executed by the processor 311. The communicator 313 can include a signal transmitter antenna 317 and optionally a signal transmitter antenna 318. While a second transmitter antenna 318 in addition to the transmitter 317 is shown in FIG. 3, a signal transmitter similar to the signal transmitter 301 can have any number of transmitter antennas, according to some embodiments, or just a single signal transmitter antenna, according to some other embodiments. The communicator 313 can be, for example, a network interface card (NIC), a Wi-Fi™ module, a Bluetooth® module and/or any other suitable wired and/or wireless communication device. Furthermore the communicator 313 can include a switch, a router, a hub and/or any other network device. The communicator 313 can be configured to connect the signal transmitter 301 to a communication network (such as the communication network 106 shown in FIG. 1). In some instances, the communicator 313 can be configured to connect, via one or more communication channels, to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 313 can facilitate receiving and/or transmitting a file and/or a set of files via one or more communication channels through a communication network (e.g., the communication network 106 in the gUBDM system 100 of FIG. 1). In some instances, a received file can be processed by the processor 211 and/or stored in the memory 312 as described in further detail herein. In some instances, as described previously, the communicator 313 can be configured to send a plurality of transformed vectors, via the signal transmitter antennas 317 and 318, to one or more signal receiver antennas associated with one or more signal receivers connected to a communication network as part of a gUBDM system. The communicator 313 can also be configured to send and/or receive data associated with a library of arbitrary transformation systems.

Returning to FIG. 1, the signal transmitters 101,102 that are connected to gUBDM system 100 can be configured to communicate with and transmit signals to signal receivers 103, 104 via one or more communication channels defined in the communication network 106. FIG. 4 is a schematic representation of a signal receiver 401 that is part of gUBDM system. The signal receiver 401 can be structurally and functionally similar to the signal receivers 103, 104 of the system 100 illustrated in FIG. 1. The signal receiver 401 includes a processor 411, a memory 412, and a communicator 413.

The processor 411 can be, for example, a hardware based integrated circuit (IC) or any other suitable processing device configured to run and/or execute a set of instructions or code. For example, the processor 311 can be a general purpose processor, a central processing unit (CPU), an accelerated processing unit (APU), an application specific integrated circuit (ASIC), a digital signal processor (DSP), a field programmable gate array (FPGA), a programmable logic array (PLA), a complex programmable logic device (CPLD), a programmable logic controller (PLC) and/or the like. The processor 411 can be operatively coupled to the memory 412 through a system bus (for example, address bus, data bus and/or control bus).

The processor 411 can be configured to receive a transformed signal that is securely transmitted via one or more communication channels defined in a communication network (e.g., network 106 of FIG. 1), obtain information associated with an arbitrary transformation that was used to generate the transformed signal, and based on the information process the transformed signal to recover an original signal (e.g., by applying an inverse of the arbitrary transformation) such that the original signal can be received by a destination in a secure and efficient manner using the gUBDM system, according to an embodiment.

The processor 411 can include a set of components including a converter 414, an arbitrary transform identifier 415, and an arbitrary transform reverser 416. The processor 411 can include, or access from memory 412, a plurality of transformed vectors 441A, 441B, representing transformed signals, received from one or more transmitter antennas of a signal transmitter (e.g., transmitter antennas 317 and 318 of signal transmitter 301) that is part of the gUBDM system that the signal receiver 401 is part of. The processor 411 can include or access in memory 412 a set of arbitrary transformations 431A and 431B, identified based on information associated with a signal received from a signal transmitter, and a set of reverse transformations 451A, 451B, computed based on the identified arbitrary transformations, and a plurality of vectors 421A, 421B representing a set of original signals.

The arbitrary transform identifier 415 can be configured to receive information associated with a transformed signal (e.g., transformed signal represented by transformed vectors 441A, 441B) received via the signal receivers 417 and 418, the information including an indication of the identity of an arbitrary transformation that was used in generating the transformed signals. The arbitrary transform identifier 415 is configured to, based on the information, identify the arbitrary transformation that can be used to recover an original signal (e.g., original signal represented by plurality of vectors 421A, 421B) from the transformed signal (e.g., transformed signals 441A, 441B).

The arbitrary transform reverser 416 generates, based on the identity of the arbitrary transformation, an inverse of the identified arbitrary transformation, also referred to as a reverse transformation (e.g., reverse transformations 451A, 451B) configured to reverse the effects of the identified arbitrary transformation to recover the original signal from a transformed signal. For example, in some embodiments, the arbitrary transform reverser 416 generates a reverse transformation (A') 451A configured to be applied on a plurality of transformed vectors 441A and 441B, representing a transformed signal, and received by the signal receiver 401, so that the reverse transformation (A') 451A can reverse the effects of an arbitrary transformation (A) 431A and recover a plurality of vectors 421A and 421B representing an original signal.

The converter 414 can be configured to receive a recovered plurality of vectors (e.g., 421A and 421B) representing an original signal and regenerate the original signal from the recovered plurality of vectors. For example, in some embodiments, the processor can receive a parallel set of symbols $b_n$. The converter 414 can be configured to perform a parallel-to-serial computation on the set of symbols $b_n$ to convert the parallel set of symbols $b_n$ to a serial set of symbols that can be similar to the original signal. In some embodiments, the converter 414 can receive a plurality of recovered vectors (e.g., vectors 421A and 421B) and generate, based on the vectors, an original signal including a set of symbols. In some embodiments, the converter 414 can receive a plurality of recovered vectors (e.g., vectors 421A and 421B) and generate, based on the recovered vectors pluralities of blocks each plurality of blocks representing a vector of the plurality of vectors. The converter 414 can then regenerate, based on the pluralities of blocks, a plurality of input bits from which it can recover an original signal.

The memory 412 of the signal receiver 401 can be similar in structure and/or function to the memory 312 of the signal transmitter 301. For example, the memory 412 can be a random access memory (RAM), a memory buffer, a hard drive, a read-only memory (ROM), an erasable programmable read-only memory (EPROM), and/or the like. The memory 412 can store, for example, one or more software modules and/or code that can include instructions to cause the processor 411 to perform one or more processes, functions, and/or the like (e.g., functions associated with the converter 414, the arbitrary transform identifier 415, the arbitrary transform reverser 416). In some embodiments, the memory 412 can include extendable storage units that can be added and used incrementally. In some implementations, the memory 412 can be a portable memory (for example, a flash drive, a portable hard disk, and/or the like) that can be operatively coupled to the processor 411. In other instances, the memory can be remotely operatively coupled with the signal receiver 401. For example, a remote database server can serve as a memory and be operatively coupled to the signal receiver 401.

The communicator 413 can be a hardware device operatively coupled to the processor 411 and memory 412 and/or software stored in the memory 412 executed by the processor 411. The communicator 413 can include a signal receiver antenna 417 and optionally a signal receiver antenna 418. While a second receiver 418 in addition to the receiver 417 is shown in FIG. 4, a signal receiver similar to the signal receiver 401 can have any number of receivers, according to some embodiments, or just a single signal receiver, according to some other embodiments. The communicator 413 can be, for example, a network interface card (NIC), a Wi-Fi™ module, a Bluetooth® module and/or any other suitable wired and/or wireless communication device. Furthermore the communicator 413 can include a switch, a router, a hub and/or any other network device. The communicator 413 can be configured to connect the signal receiver 401 to a communication network (such as the communication network 106 shown in FIG. 1). In some instances, the communicator 413 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 413 can facilitate receiving and/or transmitting a file and/or a set of files via one or more communication channels defined in a communication network (e.g., the communication network 106 in the gUBDM system 100 of FIG. 1). In some instances, a received file can be processed by the processor 411 and/or stored in the memory 412 as described in further detail herein. In some instances, as described previously, the communicator 413 can be configured such that the signal receivers 417 and 418 include one or more antennas tuned to receive transformed signals of a particular predetermined center frequency within a predetermined bandwidth, to receive transformed signals securely and efficiently transmitted by one or more signal transmitter antennas associated with one or more signal transmitters connected to a communication network as part of a gUBDM system. The communicator 413 can also be configured to send and/or receive data associated with a library of arbitrary transformation systems. In some embodiments the signal receiver 401 can include a plurality of antenna arrays configured to perform Multiple Input Multiple Output (MIMO) operations.

Figure 5A:
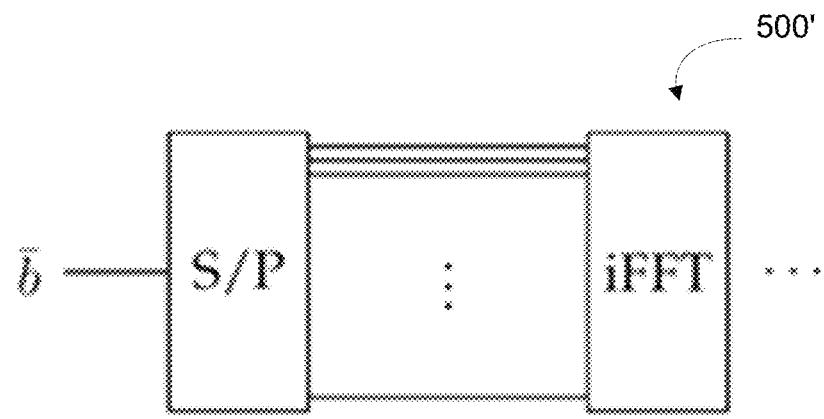
FIG. 5A is a schematic representation of a processing of a signal at a signal transmitter of an OFDM system.

In some embodiments, the gUBDM system (e.g., gUBDM system 100) can be in some aspects partly similar in stru-cture and/or function to an Orthogonal Frequency Divisional Multiplexing (OFDM) system. For example, an example pipeline for an OFDM system 500' can include a set of operations as presented in FIG. 5A, where vector b can be a set of symbols $b_n$.

In the example OFDM system 500', the symbols $b_n$ enter an OFDM transmitter and are first put through a "serial-to-parallel" (labeled "S/P" above) computation, and then they are run through an inverse FFT (labeled "iFFT" above). In some embodiments, they may be given a cyclic prefix, and undergo a pulse shaping procedure. An OFDM receiver can be configured to perform the above operations in a reverse order, except an FFT replaces the iFFT.

Figure 5B:
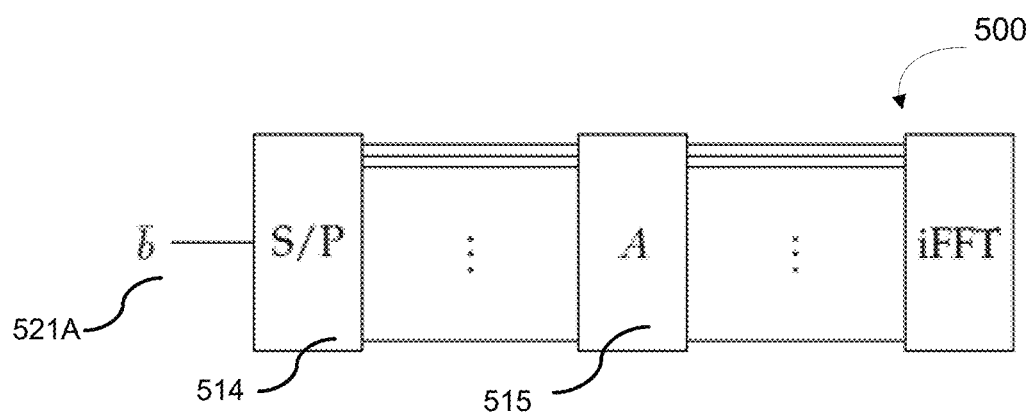
FIG. 5B is a schematic representation of a processing of a signal at a signal transmitter of a gUBDM system, according to an embodiment.

Compared to the above described OFDM system 500', operations carried out by a gUBDM system 500 described herein (e.g., gUBDM system 100) are illustrated in FIG. 4B. The gUBDM 500 can include an extra operator (e.g., a linear operator) A between the S/P block 514 and the iFFT block, as shown in FIG. 5B. In use, according to the example embodiment associated with FIG. 5B, the gUBDM 400 operates such that symbols $b_n$ are received by the signal transmitter and are first put through a serial-to-parallel block (e.g., converter similar to converter 314 of the signal transmitter 301) to generate a converted set of vectors. The converted set of vectors then undergo the linear transformation A to generate a set of transformed vectors. For example, the transformation can be carried out by an arbitrary transformation applier 515 similar to arbitrary transformation applier 316 and the linear transformation A being selected by arbitrary transformation selector similar to the arbitrary transformation selector 315. In some embodiments, the transformed vectors are then put through an iFFT block to generate a second transformed vectors and the resulting second transformed vectors can be transmitted to one or more receivers in the gUBDM system. In some other embodiments, the iFFT block can be skipped and the transformed vectors generated by the arbitrary transformation applier can be transmitted to one or more receivers in the gUBDM system. Expressed in another way, $$\vec{b} \rightarrow A\vec{b} \rightarrow \vec{s} = \mathcal{F} A\vec{b}.$$

Figure 5C:
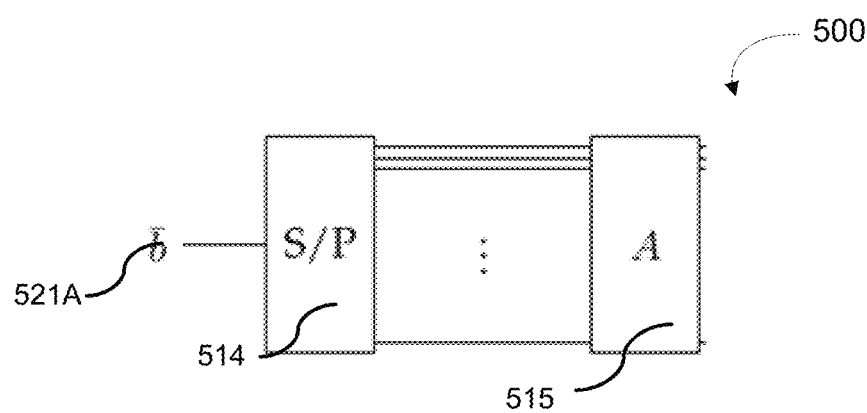
FIG. 5C is a schematic representation of a processing of a signal at a signal transmitter of a gUBDM system, according to an embodiment

(where $\mathcal{F}$ is the discrete Fourier matrix). In some embodiments, A can be unitary by design, as described herein, and F is known to be unitary. By property of unitary matrices as a group, the product FA will also be unitary. Therefore, because A can be any unitary, including the iFFT matrix is unnecessary, and according to some embodiments a gUBDM system can be configured by replacing the iFFT block with an arbitrary unitary A, as illustrated in FIG. 5C showing the operations in a gUBDM system 500, including an arbitrary transform applier 515, according to an embodiment.

Following the above description a signal transmitter and a signal receiver operable with an OFDM system (e.g., OFDM system 500 of FIG. 5A) can be easily adapted to be used with a gUBDM system described herein (e.g., gUBDM systems 500 in FIGS. 5B and 5C) with the only changes being a replacement of an iFFT operation with an arbitrary transformation operation using A at the transmitter and the FFT with A' at the signal receiver to reverse the transformation. Other details of an OFDM system can remain.

The above described gUBDM system, in use, can be used to transmit signal in a highly secure and efficient manner as described in detail below. Given a signal transmission system, where one or more signals are transmitted from a source associated with a user Alice to a destination associated with a user Bob, such a system may be vulnerable to eavesdropping by a third party user Eve who may have access to the transmitted signal or transmitted vectors. Given that a gUBDM system is being used for the signal transmission, where an arbitrary transformation A is used to generate the transformed signal or transformed vectors that are being transmitted, if Eve doesn't know the matrix A and is only able to base her attack on knowing cipher, the amount of work she has to do to recover the data can be prohibitively large. In some other embodiments, the arbitrary transformation can be non-linear in nature, making it even more complicated and infeasible for Eve to find the non-linear transformation to recover signals even if she has access to plaintext/ciphertext pairs.

Figure 6:
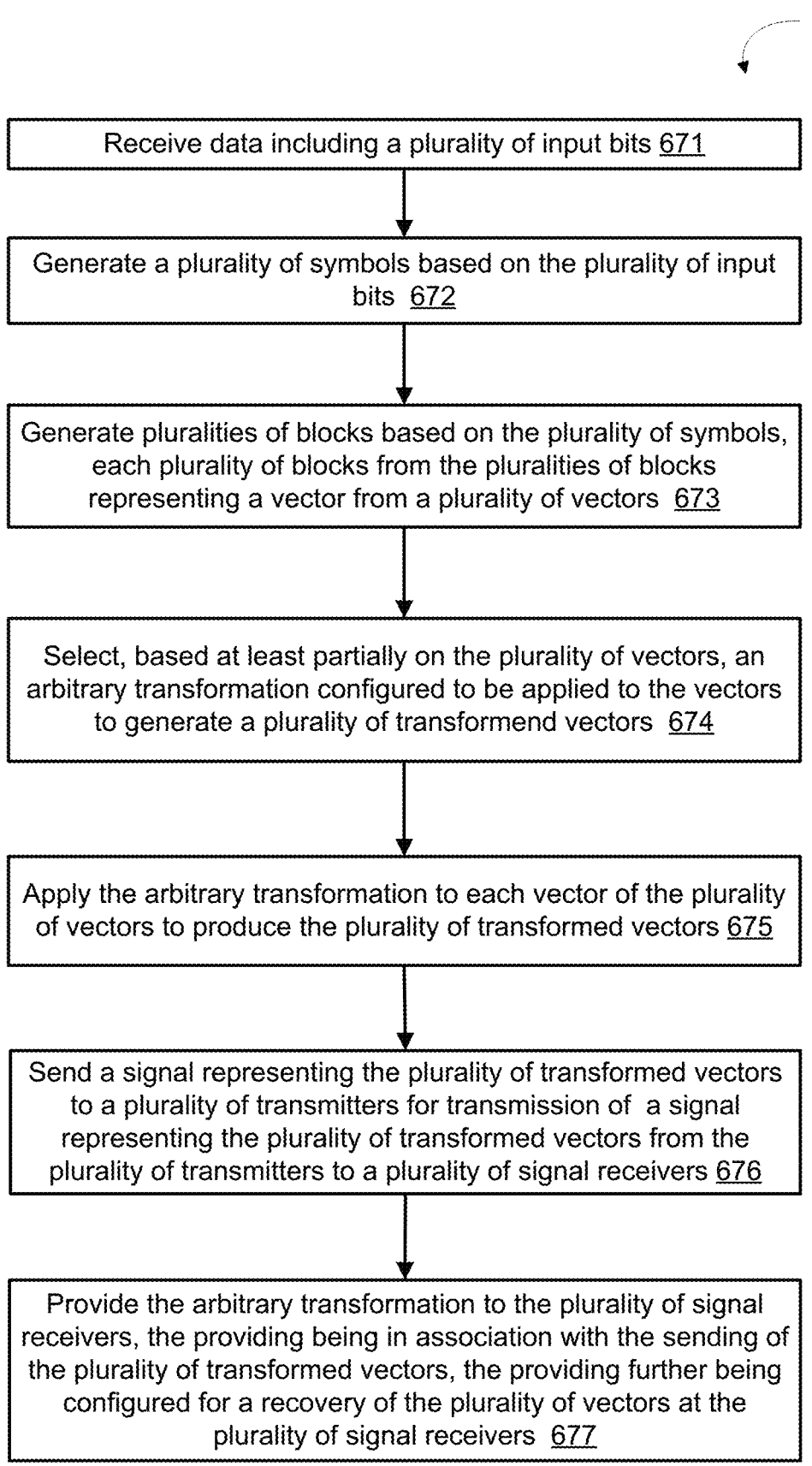
FIG. 6 is a flowchart describing a method of processing and transmitting a signal using a gUBDM system, according to an embodiment.

FIG. 6 illustrates a flowchart describing an example method 600 of preparing a signal and transmitting a signal in a secure and efficient manner using a gUBDM system, according to an embodiment. At 671, according to the method 600, a signal transmitter of a gUBDM system (e.g., the signal transmitter 201 described above) receives data including a plurality of input bits. The plurality of input bits can represent an original signal that is to be transmitted in a secure and efficient manner. The data can further include other attributes associated with the signal represented by the input bits. For example the data can include information related to the nature of the signal, the nature of the input bits, the size, sensitivity of the information contained, security requirement, etc.

At 672, the signal transmitter generates a plurality of symbols based on the plurality of input bits. In some instances, the signal transmitter can generate a plurality of symbols with a symbol being described as a pulse in a digital complex baseband signal. In some implementations, a symbol can be a waveform, or a state that, when transmitted through a communication channel defined in a communications network, can change/alter and/or maintain a state or a significant condition of the communication channel such that the state or condition persists, for a fixed period of time. In some instances, a signal transmitter can break up a plurality of input bits associated with a serial signal into a plurality of symbols that can be modified and/or transmitted in parallel using a Multiple Input and Multiple Output system of transmission as described further below. In some instances, a signal transmitter can use a converter (e.g., converter 314) to convert a serial plurality of input bits into a parallel plurality of symbols. In some implementations, the generating a plurality of symbols based on a plurality of input bits can be via using a bit-to-symbol map.

At 673, the signal transmitter generates pluralities of blocks based on the plurality of symbols, each plurality of blocks from the pluralities of blocks representing a vector from a plurality of vectors. In some instances, a signal transmitter can receive a serial plurality of symbols associated with a serial signal and break it up into pluralities of blocks each plurality of block representing a vector from a plurality of vectors, the vectors being configured to be transformed and/or transmitted in parallel using a Multiple Input and Multiple Output system of transmission as described herein. In some instances, a signal transmitter can use a converter (e.g., converter 314) to convert the serial plurality of symbols into the pluralities of blocks.

At 674, the signal transmitter select, based at least partially on the plurality of vectors, an arbitrary transformation configured to be applied to the vectors to generate a plurality of transformed vectors. For example, the signal transmitter can have access to a library of arbitrary Transformations including unitary transformations, equiangular tight frame (ETF) transformations, and a nearly equiangular tight frame (NETF) transformations. The signal transmitter can use an arbitrary transformation selector (e.g., arbitrary transformation selector 315) to select arbitrary transformation, for example a unitary transformation, to be applied on the plurality of vectors to generate a plurality of transformed vectors. In some instances, the arbitrary transformation can select an equiangular tight frame (ETF) transformation, or in some other instances the arbitrary transformation selector can select a nearly equiangular tight frame (NETF) transformation. In some implementations, the arbitrary transformation selector can be configured such that the arbitrary transformation selected is based on a matrix that is not an identity matrix or a discrete Fourier matrix. In some implementations, the arbitrary transformation selector can be configured such that the arbitrary transformation selected is based on a matrix that is not a direct sum of discrete Fourier matrices.

At 675, the signal transmitter applies the arbitrary transformation to each vector of the plurality of vectors to produce the plurality of transformed vectors. In some instances, the applying the arbitrary transformation can be such that the plurality of transformed vectors has a total magnitude that substantially equals a total magnitude of the plurality of vectors.

At 676, the signal transmitter sends a signal representing the plurality of transformed vectors to a plurality of transmitter antennas for transmission of a signal representing the plurality of transformed vectors from the plurality of transmitter antennas to a plurality of signal receivers. In some instances, the plurality of transformed vectors can be configured to be sent in parallel via multiple transmitter antennas associated with the signal transmitter antenna device (e.g., transmitter antennas 317 and 318 associated with the signal transmitter 301) and through multiple communication channels using a Multiple Input and Multiple Output system of transmission such that the transformed vectors sent in parallel can be received by a plurality of receivers associated with one or more signal receivers associated with the gUBDM system being used. For example, the plurality of signal receivers can include a plurality of antenna arrays, and the plurality of signal receivers be associated with signal receivers such as the signal receiver 401 and the plurality of signal transmitter antennas can be associated with signal transmitters such as the signal transmitter 301, where in the signal transmitter and the signal receiver are configured to perform Multiple Input Multiple Output (MIMO) operations.

In some implementations, the signal can include a set of transformed symbols associated with the plurality of transformed vectors and a signal transmitter (e.g., signal transmitter 301) can place a set of transformed symbols on the communication channel (s) (e.g., via a transmitter 317) at a fixed and known symbol rate. A signal receiver can perform the task of detecting the sequence of transformed symbols to reconstruct the transformed vectors. In some instances, there may be a direct correspondence between a transformed symbol and a small unit of data. For example, each transformed symbol may encode one or several binary digits or 'bits'. The data may also be represented by the transitions between transformed symbols, or even by a sequence of many transformed symbols.

In some implementations, the signal transmitter can be configured to send the signal representing the plurality of transformed vectors to the plurality of transmitters via a physical layer associated with an open system interconnection model (OSI). The OSI model is a conceptual model that characterizes and standardizes the communication functions of a telecommunication or computing system without regard to its underlying internal structure and technology with the goal of achieving interoperability of diverse communication systems using standard communication protocols. The OSI model uses partitioning of information exchanged via communication channels of a communication network into abstraction layers (e.g., seven layers) with each layer including information of a specific type.

For example, a layer 1 can include a physical layer used for the transmission and reception of unstructured raw data between a signal transmitter and a physical transmission medium (e.g., a wireless communication channel in a communication network such as network 106). It is configured to convert digital bits included in the signals transmitted into electrical, radio, or optical signals. Layer specifications define characteristics such as voltage levels, the timing of voltage changes, physical data rates, maximum transmission distances, modulation scheme, channel access method and physical connectors. This includes the layout of pins, voltages, line impedance, cable specifications, signal timing and frequency for wireless devices. Bit rate control is done at the physical layer and may define transmission mode as simplex, half duplex, and full duplex. The components of a physical layer can be described in terms of a network topology. The communications channel used to transmit the signal can have specifications for a physical layer.

At 677, the signal transmitter provides the arbitrary transformation to the plurality of signal receivers, the providing being in association with the sending of the plurality of transformed vectors, the providing further being configured for a recovery of the plurality of vectors at the plurality of signal receivers. In some implementations, the plurality of signal receivers is further configured to transmit a signal representing the plurality of transformed vectors to a target device. For example the plurality of signal receivers can be associated with one or more signal receivers that can be configured to transmit a signal representing the plurality of transformed vectors to a target device.

In some instances, the signal transmitter can send a signal that, in addition to representing the plurality of transformed vectors, can also be representing one of: (1) the arbitrary transformation, or (2) an inverse of the arbitrary transformation to the plurality of signal receivers. In some instances, the signal transmitter can send a first signal representing the plurality of transformed vectors and send a second signal representing the arbitrary transformation or an inverse of the arbitrary transformation. In some implementations the signal transmitter can send the second signal at a time point prior to the sending of the first signal. That is, said in another way, the signal transmitter can send the signal representing the arbitrary transformation or an inverse of the arbitrary Transformation prior to transmission of the signal representing the plurality of transformed vectors to the plurality of signal receivers, such that the plurality of signal receivers recovers the plurality of vectors from the plurality of transformed vectors based on the arbitrary transformation or an inverse of the arbitrary transformation.

Figure 7:
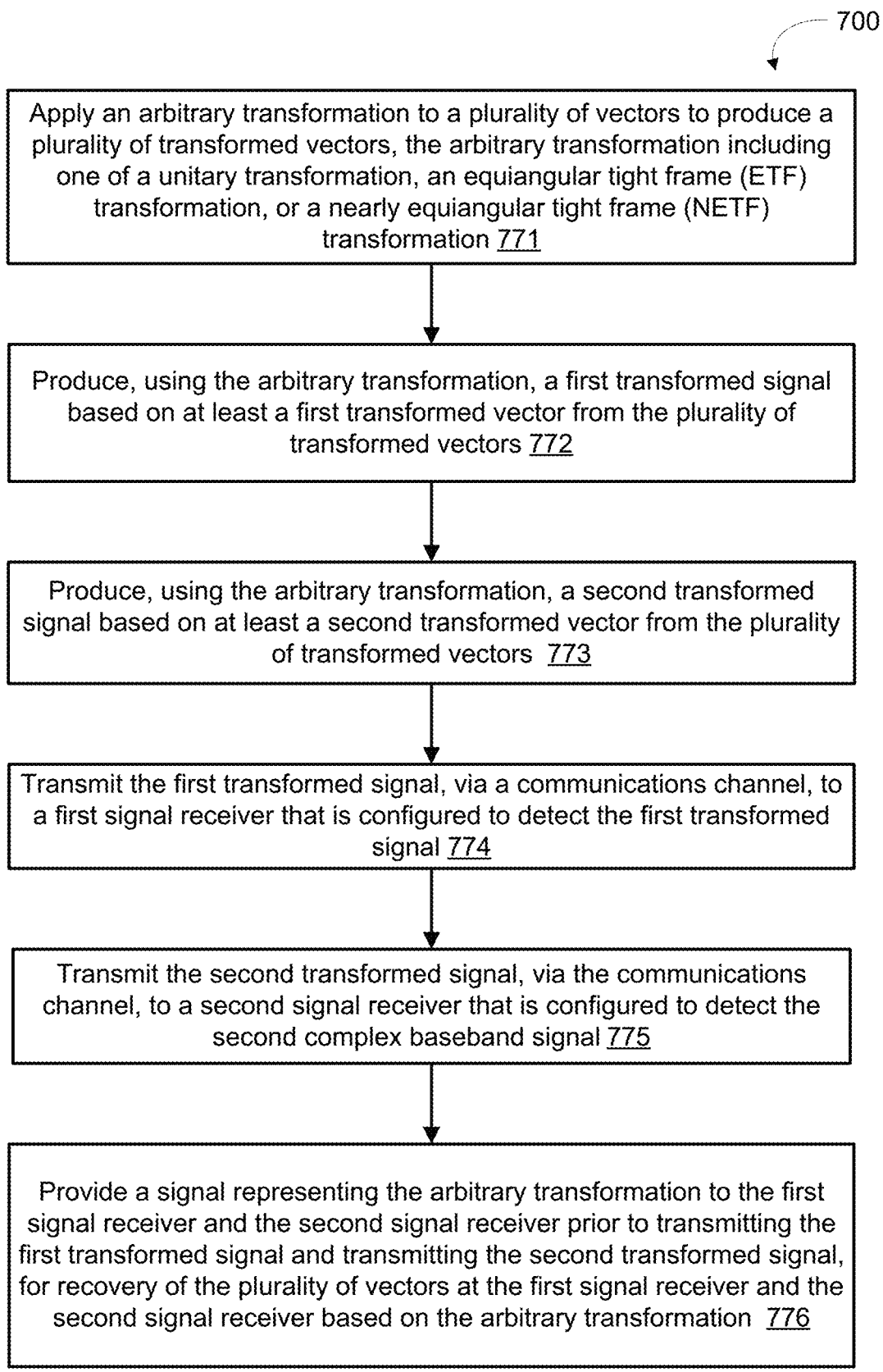
FIG. 7 is a flowchart describing a method of processing and transmitting a signal using a gUBDM system, according to an embodiment

FIG. 7 illustrates an example method 600 of transmitting a signal in a secure and efficient manner, using a gUBDM system according to an embodiment. The method 700 can be implemented by a processor for example a processor associated with a signal transmitter of a gUBDM system (e.g., the signal transmitter 201 described above). At 771, an arbitrary transformation is applied to a plurality of vectors to produce a plurality of transformed vectors. The arbitrary transformation can include a unitary transformation, an equiangular tight frame (ETF) transformation, or a nearly equiangular tight frame (NETF) transformation. In some implementations, more than one arbitrary transformations can be applied. For example in some instances, the signal transmitter implementing the method 700 can be configured such that a first arbitrary transformation is applied to the plurality of vectors to produce a first plurality of transformed vectors and a second arbitrary transformation is applied to the plurality of vectors to produce a second plurality of transformed vectors.

At 772, the method includes producing, using the arbitrary transformation, a first transformed signal based on at least a first transformed vector from the plurality of transformed vectors. In some instances the first transformed signal can include a first complex baseband signal. At 773, the method includes producing, using the arbitrary transformation, a second transformed signal based on at least a second transformed vector from the plurality of transformed vectors. In some instances, the second transformed signal can include a second complex baseband signal.

As described above, in some implementations the second transformed signal can be based on a second transformed vector the second plurality of transformed vectors generated using the second arbitrary transformation.

At 774, the method 700 includes transmitting the first transformed signal, via a communications channel, to a first signal receiver that is configured to detect the first transformed signal. At 775, the method includes transmitting the second transformed signal, via the communications channel, to a second signal receiver that is configured to detect the second complex baseband signal. In some instances, the transmitting the second transformed signal is via a second communications channel different from the first communications channel.

At 776, the method includes providing a signal representing the arbitrary transformation to the first signal receiver and the second signal receiver in association with the transmitting the first transformed signal and the transmitting the second transformed signal, for recovery of the plurality of vectors at the first signal receiver and the second signal receiver based on the arbitrary transformation. In some instances, the providing the signal representing the arbitrary transformation is done prior to transmitting the first transformed signal and the transmitting the second transformed signal. In some other instances, the providing the signal representing the arbitrary transformation can be done after the transmitting the first transformed signal and the transmitting the second transformed signal, in which case the signal receivers can store the transformed signal(s) received and recover the original signals at a later point in time after receiving the signal representing the arbitrary transformation. In some instances, the signal receivers can be configured to transmit a transformed signal to a target device. For example, the signal receivers can be configured to transmit a signal representing the plurality of transformed vectors to a designated target device.

As described above, in some instances where a first arbitrary transformation is used to produce the first plurality of transformed vectors and a second arbitrary transformation is used to the second plurality of transformed vectors, the providing a signal representing the arbitrary transformation can include providing a first signal representing the first arbitrary transformation and providing a second signal representing the second arbitrary transformation. In some implementations, the transmitting the first transformed signal and the providing the first signal representing the first arbitrary transformation can be to a first receiver associated with a first receiver, and the transmitting the second transformed signal produced using the second arbitrary transformation and the providing the second signal representing the second arbitrary transformation can be to a second receiver antenna associated with a second receiver different from the first receiver. In some instances, the first and second signals representing the first and second arbitrary transformations can be broadcast together to a wide audience including the first and second signal receivers. In some instances the first signal representing the arbitrary transformation can be broadcast widely but not the second signal representing the arbitrary transformation, such that the first signal receiver is able to recover the first plurality of vectors but the second receiver is unable to recover the second plurality of transformed vectors until the second signal representing the second arbitrary transformation is provided or broadcast.

While described as a variation of an OFDM system, some embodiments of a gUBDM system operate as a variation of a DSSS system wherein a "code map" is used and is bandwidth limited. The explicit form, as given in the '839 patent referred to above, is $$\bar{c}: \mathbb{C}^N \to \mathbb{C}^M$$

$$\bar{v} \longmapsto \bar{c}(\bar{v}), \tag{33}$$

where the $m^{th}$ component of $\bar{c}(\bar{v}) \in \mathbb{C}^M$ is given by $$[\bar{c}(\bar{v})]_m = \sum_{n=1}^{N} v_n e^{-2\pi i \kappa_n \left(\frac{m}{M} - \frac{1}{2}\right)}. \tag{34}$$

Here, $v_n$ is the $n^{th}$ component of $\bar{v}$, the $\kappa$s are a set of N distinct numbers satisfying $$\kappa_n - \kappa_m \in \mathbb{Z} \, \forall m, n, \tag{35}$$

and M is an integer chosen so that $M > 2 \max_n |\kappa_n|$. This map has the properties discussed above (band-limited and dot-product preserving). Typically, $M \approx N$ if the $\kappa$ are sequential integers centered around 0.

So, to create a maximal set of mutually orthogonal spreading codes, a unitary matrix $A \in U(N)$ is chosen. If the $n^{th}$ column is denoted (or row, doesn't matter which as long as there is consistency) of A as $\bar{A}_n$, then the N codes are $\bar{c}(\bar{A}_n)$ for $n \in [1, \ldots, N]$.

If one device is to transmit data on all N codes, then it will be able to take the N symbols $b_n$, multiply each one by every component of its spreading code, and then add the resulting vectors together. So the transmitted vector $\bar{s}$ is $$\bar{s} = \sum_{n=1}^{N} b_n \bar{c}(\bar{A}_n), \tag{36}$$

where $b_n$ are the symbols.

But to do this, the transmitter multiplies a symbol b_n∈C which is typically a complex number (a float, double, etc), times all M≈N components of $\bar{c}(\bar{A}\_n)$. This is repeated for all N symbols b_n. So, there are N symbols, each being multiplied by N components of the code. This makes the complexity O[(N]^2), which is prohibitive for wide-band applications. (Compare to OFDM, which is O(N log N).)

Notably for multiple access applications, where each user is given a subset of the codes, they only have to do O(N) work, which is better than OFDM. That makes the DSSS implementation very good for multiple access applications.

To obtain a UBDM that is O(N log N), to match OFDM reinterpret (0.0.4). The transmitted baud is $$[\bar{s}]_m = \sum_{n=1}^{N} b_n [\bar{c}(\bar{A}_n)]_m \tag{37}$$

$$= \sum_{n=1}^{N} b_n \sum_{k=1}^{N} A_{nk} e^{-2\pi i \kappa_k \left(\frac{m}{M} - \frac{1}{2}\right)}$$

$$= \sum_{k=1}^{N} \left( \sum_{n=1}^{N} b_n A_{nk} \right) e^{-2\pi i \kappa_k \left(\frac{m}{M} - \frac{1}{2}\right)}$$

$$= \sum_{k=1}^{N} \tilde{b}_k e^{-2\pi i \kappa_k \left(\frac{m}{M} - \frac{1}{2}\right)}.$$

This can be interpreted (up to normalization) as a discrete Fourier transform of the symbols $$\tilde{b}_k \equiv \sum_{n=1}^{N} b_n A_{nk}. \tag{38}$$

Figure 8:
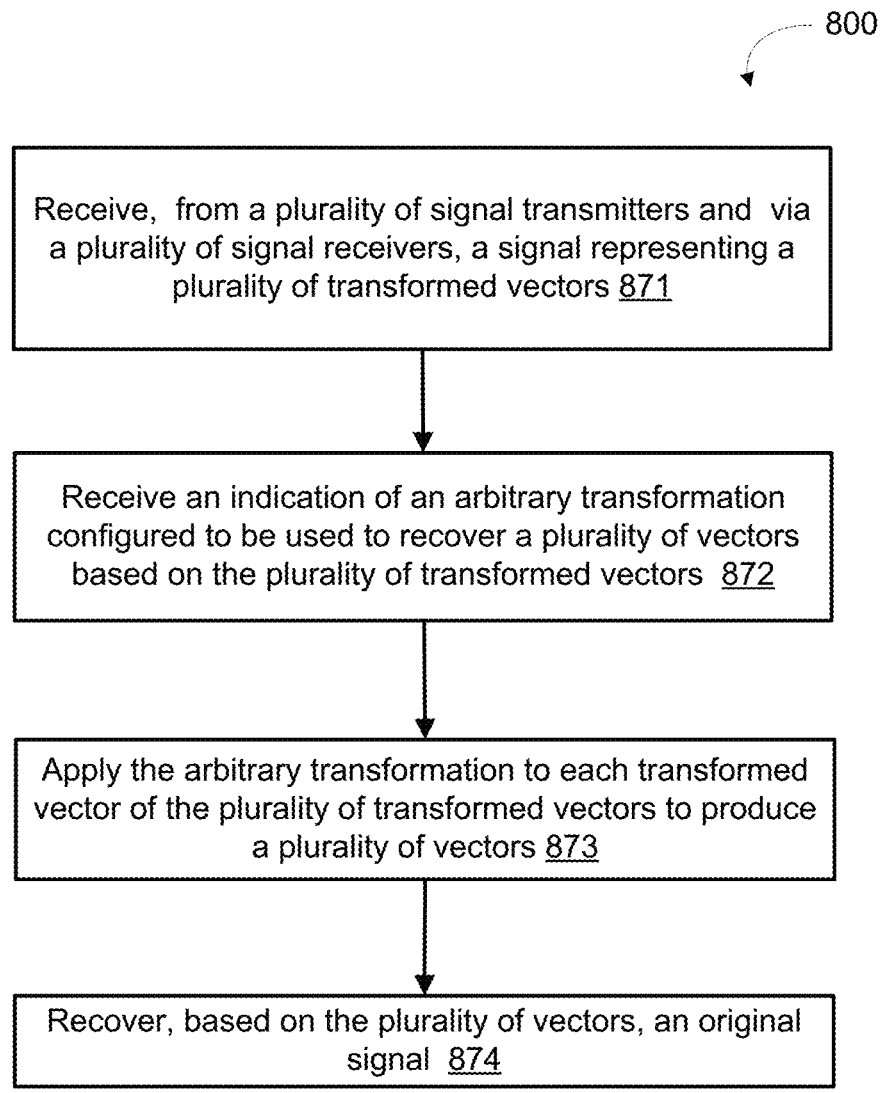
FIG. 8 is a flowchart describing a method of receiving and recovering a signal using a gUBDM system, according to an embodiment.

FIG. 8 is a flowchart describing an example method for a reception of a plurality of transformed vectors and recovery of a plurality of vectors, using a gUBDM system according to an embodiment. The method 800 can be implemented by a processor associated with a signal receiver (e.g., signal receiver 401) described herein.

At 871, the method 800 includes receiving from a plurality of signal transmitters and via a plurality of signal receivers, a signal representing a plurality of transformed vectors.

At 872, the method includes receiving an indication of an arbitrary transformation configured to be used to recover a plurality of vectors based on the plurality of transformed vectors. In some implementations, the receiving the indication of the arbitrary transformation can be from the plurality of signal transmitters and via the plurality of signal receivers. In some instances the receiving the indication of the arbitrary transformation can be prior to the receiving the signal representing a plurality of transformed vectors. In some instances the indication can include an inverse of the arbitrary transformation.

At 873, the method includes applying the arbitrary transformation to each transformed vector of the plurality of transformed vectors to produce a plurality of vectors. At 874, the method includes recovering, based on the plurality of vectors, an original signal. In some instances for example the recovering the original signal can be performed by a converter (e.g., converter 414) associated with a signal receiver. In some instances the method 800 can skip the recovering the original signal at 873 and instead store or send the plurality of vectors to another device to perform the recovering of the original signal.

Another advantage of the above described gUBDM system is that it is designed to take full advantage of the richness and structure of the unitary groups. One opportunity the gUBDM system described affords is the ability to incorporate ETF/NETFs into an adopted and modified OFDM system variation—this is something that is impossible in an OFDM system otherwise unmodified.

The gUBDM system also affords a signal transmission source the ability to include code division multiplexing into an OFDM system upon modification into a gUBDM system. This means that in addition to time division, frequency division, and spatial multiplexing, we can do code division multiplexing can be performed. This adds an enormous degree of freedom for system engineers.

It should be noted that an iFFT will still be likely performed after applying a general unitary A, in some implementations, which can make equalization easier. So, take a data vector b and send it through the steps b→Ab→FAb, where F is a Fourier transformation. However, because of the group structure of U(N), it is known that if F and A are both elements of U(N) are used, then their product will be as well. Because we are using the entire group U(N), there is no difference between claiming a single matrix A and claiming a single matrix A followed by a Fourier matrix. No matter how many unitary matrices we multiplied together, the result is still just another element of U(N).

In other words, a key advantage of this approach is the security. If the act of modulating the data is able, by itself, to fully secure the content to an eavesdropper on that channel, denying her access to the bits (or anything above OSI layer 1), then the attack surface for the eavesdropper has changed radically. All possibilities of traffic analysis attacks, protocol weakness attacks, control data leakage attacks, etc. are completely eliminated. Furthermore, in networks where the security provided by traditional encryption causes delay/latency that adversely impacts the network, the encryption (usually at OSI layer 3 or higher) can be optionally completely removed. This eliminates the space, power, heat, or time to include the encryption, as well as the overhead usually associated with encryption. Furthermore, the delays/latency associated with encryption (everything from simply having to pass the information up and down the OSI stack to the latency associated with simply having to run those bits through the cryptologic) can be eliminated. All the system needs to do is transmit. The modulation itself takes care of the security.

The signal receiver is open to any computation upon receiving the transformed signal. In some implementations, the signal receiver can simply demodulate the signal and recover the symbols and bits. In some implementations, the signal receiver may also want to store the digitized I and Q, or pass the digitized I and Q on to some other system without applying the inverse of the unitary matrix.

Figure 9:
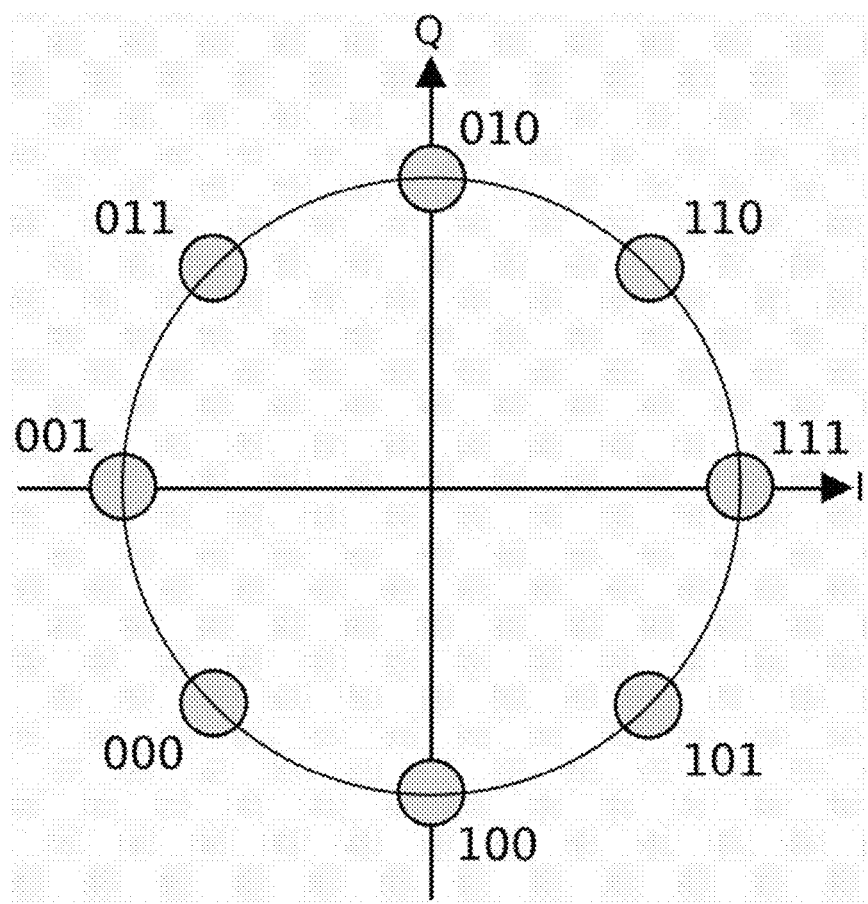
FIG. 9 is an example constellation diagram.
Figure 10:
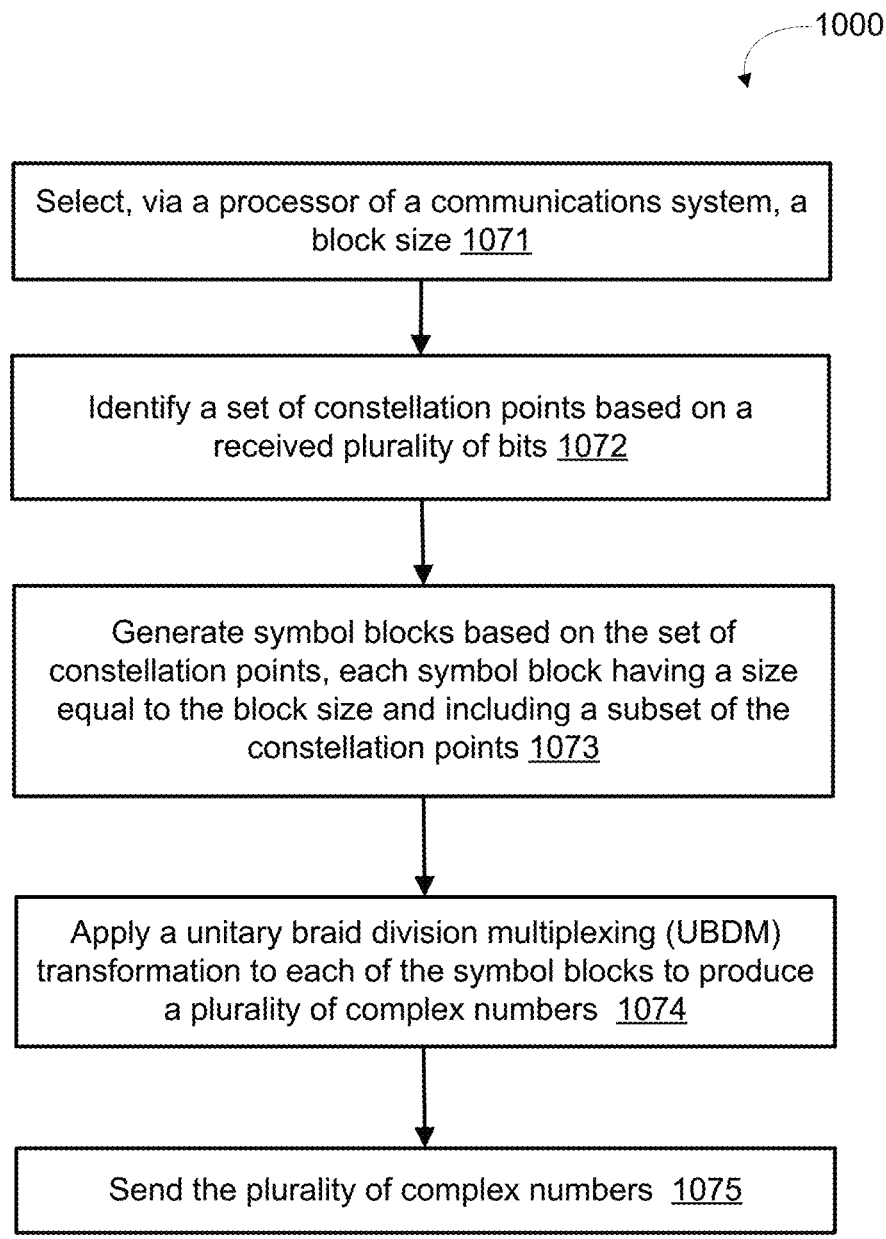
FIG. 10 is a flow diagram illustrating a first method for modulation-agnostic UBDM signal transformation, according to an embodiment.

FIG. 9 is an example constellation diagram. As shown in FIG. 9, the constellation diagram is a two-dimensional xy-plane scatter diagram, representing a signal modulated by a digital modulation scheme. As such, each instance of a constellation diagram can have a particular modulation scheme with which it is associated. FIG. 10 is a flow diagram illustrating a first method for modulation-agnostic UBDM signal transformation (e.g., employing gUBDM), according to an embodiment. As shown in FIG. 10, the method 1000 include selecting, at 1071 and via a processor of a communications system, a block size. The communications system can be configured to perform at least one of Quadrature Amplitude Modulation (QAM), Amplitude Phase Shift Keying (APSK) modulation, or Orthogonal Frequency-Division Multiplexing. In addition, the communications system can include one or more of a wireless communication system, a wired communication system, or a fiber optic communication system. At 1072, the processor identifies a set of constellation points of a constellation diagram, based on a received plurality of bits. The processor can identify the constellations points based, for example, on the constellation diagram itself, data associated with the constellation diagram, a representation of a constellation diagram or portion thereof, etc. Identifying the set of constellation points can include mapping the received plurality of bits to the constellation diagram (e.g., using a gray code). The constellation diagram is associated with a modulation scheme. At 1073, the processor generates a plurality of symbol blocks based on the set of constellation points. Each symbol block from the plurality of symbol blocks has a size equal to the block size and includes a subset of constellation points from the set of constellation points. At 1074, the processor applies a unitary braid division multiplexing (UBDM) transformation to each symbol block from the plurality of symbol blocks to produce a plurality of complex numbers, and at 1075, the processor sends the plurality of complex numbers. Optionally, the method 1000 also includes causing transmission of at least one signal representing the plurality of complex numbers using the modulation scheme (not shown).

Figure 11:
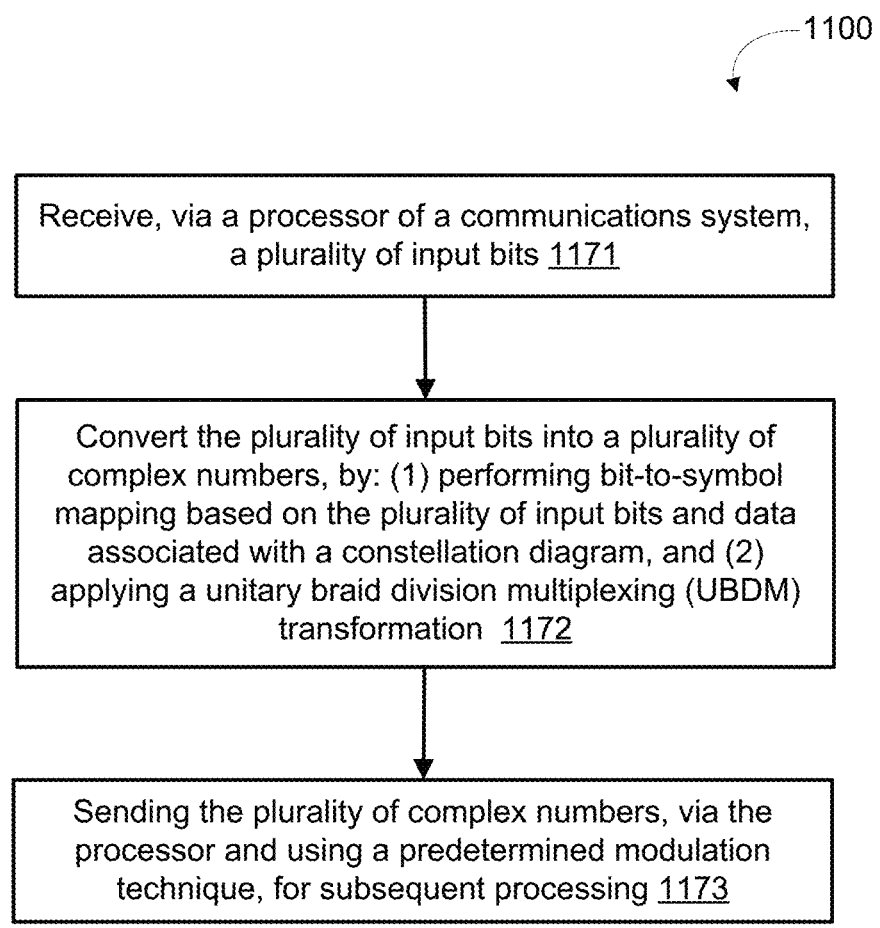
FIG. 11 is a flow diagram illustrating a second method for modulation-agnostic UBDM signal transformation, according to an embodiment.

FIG. 11 is a flow diagram illustrating a second method for modulation-agnostic UBDM signal transformation, according to an embodiment. As shown in FIG. 11, the method 1100 includes receiving, via a processor of a communications system, a plurality of input bits at 1171. The communications system can include one or more of: a wireless communication system, a wired communication system, or a fiber optic communication system. The method 1100 also includes converting, at 1172, the plurality of input bits into a plurality of complex values. Converting the plurality of input bits into a plurality of complex values can include performing bit-to-symbol mapping (e.g., using a gray code) based on the plurality of input bits, and applying a unitary braid division multiplexing (UBDM) transformation (e.g., including a plurality of nonlinear layers and a plurality of linear layers). The bit-to-symbol mapping can be based, for example, on the constellation diagram itself, data associated with the constellation diagram, a representation of a constellation diagram or portion thereof, etc. At 1173, the plurality of complex values is sent, via the processor and using a predetermined modulation technique, for subsequent processing (e.g., pulse shaping and/or the application of at least one filter). The predetermined modulation technique can include one or more of Quadrature Amplitude Modulation (QAM), Amplitude Phase Shift Keying (APSK) modulation, or Orthogonal Frequency-Division Multiplexing. Optionally, the method 1100 also includes causing transmission of at least one signal representing the plurality of complex numbers using the modulation scheme (not shown).

Figure 12:
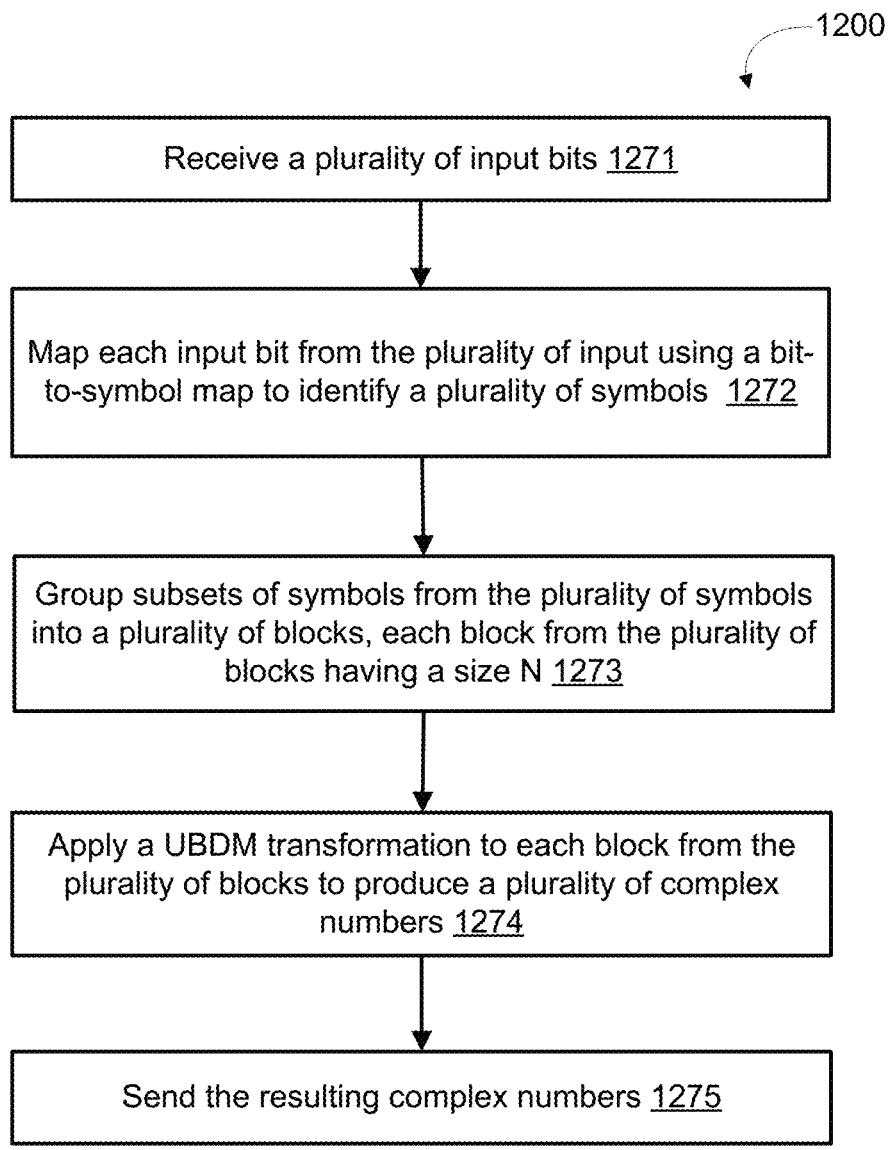
FIG. 12 is a flow diagram illustrating a third method for modulation-agnostic UBDM signal transformation, according to an embodiment.

FIG. 12 is a flow diagram illustrating a third method for modulation-agnostic UBDM signal transformation, according to an embodiment. As shown in FIG. 12, the method 1200 includes receiving a plurality of input bits, at 1271, and mapping each input bit from the plurality of input bits (e.g., to a constellation), at 1272, using a bit-to-symbol map to identify a plurality of symbols. The constellation can be a constellation of a constellation diagram for a signal to be transmitted wirelessly, or through wired or fiber optic communication. Subsets of symbols from the plurality of symbols are grouped at 1273 into a plurality of blocks, each block from the plurality of blocks having a size N. At 1274, a UBDM transformation is applied to each block from the plurality of blocks to produce a plurality of complex numbers, and the resulting complex numbers are sent at 1275, for example, to a downstream portion of the communication system (e.g., to one or more filters of, or operably coupled to, the processor) for at least one of pulse shaping or filter application. In some such implementations, the method does not include the application of an inverse Fourier transform prior to sending the transmitted signal. Alternatively or in addition, the method does not include the generation of spreading codes.

EXAMPLE EMBODIMENTS

In a first example embodiment, a method includes applying an arbitrary transformation to a plurality of vectors to produce a plurality of transformed vectors, the arbitrary transformation including one of a unitary transformation, an equiangular tight frame (ETF) transformation, or a nearly equiangular tight frame (NETF) transformation. For example, the arbitrary transformation can include a matrix having rows that form one of an equiangular tight frame or a nearly equiangular tight frame. The method also includes producing a first transformed signal, using the arbitrary transformation, based on at least a first transformed vector from the plurality of transformed vectors. The method also includes producing a second transformed signal, using the arbitrary transformation, based on at least a second transformed vector from the plurality of transformed vectors. The method also includes transmitting the first transformed signal (e.g., via a first transmitter), via a first communications channel, to a first signal receiver that is configured to detect the first transformed signal, and transmitting the second transformed signal (e.g., via a second transmitter different from the first transmitter), via a second communications channel, to a second signal receiver that is configured to detect the second transformed signal. The method also includes causing transmission of a signal representing the arbitrary transformation, for subsequent recovery of the plurality of vectors based on the arbitrary transformation. The method optionally also includes performing an inverse fast Fourier transform (iFFT) on at least one of the first transformed signal and the second transformed signal prior to transmitting the first transformed signal and the second transformed signal.

The first communications channel can be different from the second communications channel. Alternatively or in addition, the plurality of transformed vectors can have a total magnitude that substantially equals a total magnitude of the plurality of vectors. Alternatively or in addition, producing the first transformed signal and producing the second transformed signal do not include the use of a spreading code vector. Alternatively or in addition, transmitting the first transformed signal and transmitting the second transformed signal can be performed using multiple access communication.

The first example embodiment can also include generating the plurality of vectors. The generating can include generating a plurality of symbols based on a plurality of input bits using a bit-to-symbol map, and generating a plurality of blocks based on the plurality of symbols, each block from the plurality of blocks representing a vector from the plurality of vectors.

In some implementations of the first example embodiment, the arbitrary transformation is based on a matrix that is not an identity matrix or a discrete Fourier matrix. Alternatively or in addition, the arbitrary transformation is based on a matrix that is not a direct sum of discrete Fourier matrices.

In a second example embodiment, a system includes a plurality of signal receivers, a plurality of signal transmitters, and at least one processor operably coupled to the plurality of signal transmitters. The at least one processor is configured to generate a plurality of vectors. The at least one processor can be configured to generate the plurality of vectors, for example, by generating a plurality of symbols based on a plurality of input bits using a bit-to-symbol map, and generating pluralities of blocks based on the plurality of symbols, each plurality of blocks from the pluralities of blocks representing a vector from the plurality of vectors. The at least one processor is also configured to apply an arbitrary transformation to each vector from the plurality of vectors to produce a plurality of transformed vectors. The arbitrary transformation includes one of a unitary transformation, an equiangular tight frame (ETF) transformation, or a nearly equiangular tight frame (NETF) transformation.

The arbitrary transformation may be based on a matrix that is not an identity matrix or a discrete Fourier matrix. Alternatively or in addition, the arbitrary transformation may be based on a matrix that is not a direct sum of discrete Fourier matrices. The plurality of transformed vectors can have a total magnitude that substantially equals a total magnitude of the plurality of vectors. The at least one processor is also configured to send a signal representing the plurality of transformed vectors to the plurality of transmitters (e.g., via the physical layer of the open system interconnection model) for transmission of the plurality of transformed vectors to the plurality of signal receivers. Optionally, the at least one processor is also configured to send a signal representing one of: (1) the arbitrary transformation, or (2) an inverse of the arbitrary transformation to the plurality of signal receivers prior to transmission of the signal representing the plurality of transformed vectors to the plurality of signal receivers, such that the plurality of signal receivers recovers the plurality of vectors from the plurality of transformed vectors based on the arbitrary transformation or an inverse of the arbitrary transformation. The plurality of signal receivers can also be configured to transmit a signal representing the plurality of transformed vectors to a target device.

In some implementations of the second example embodiment, the plurality of signal receivers includes a plurality of antenna arrays, and the plurality of signal receivers and the plurality of signal transmitters are configured to perform Multiple Input Multiple Output (MIMO) operations.

In a third example embodiment, a method includes generating a plurality of vectors, and applying an arbitrary transformation to each vector from the plurality of vectors to produce a plurality of transformed vectors. The arbitrary transformation can include one of a unitary transformation, an equiangular tight frame (ETF) transformation, or a nearly equiangular tight frame (NETF) transformation. The plurality of transformed vectors can have a total magnitude that substantially equals a total magnitude of the plurality of vectors. The method also includes sending a signal representing the plurality of transformed vectors to a plurality of transmitters for transmission of a signal representing the plurality of transformed vectors from the plurality of transmitters to a plurality of signal receivers. The method also includes providing the arbitrary transformation to the first signal receiver and the second signal receiver, for recovery of the plurality of vectors at the first signal receiver and at the second signal receiver. Optionally, the method also includes sending the signal representing the plurality of transformed vectors to the plurality of transmitters via the physical layer of the open system interconnection model.

In some implementations of the third example embodiment, the plurality of signal receivers includes a plurality of antenna arrays, and the plurality of signal receivers and the plurality of signal transmitters are configured to perform Multiple Input Multiple Output (MIMO) operations.

The arbitrary transformation can be based on a matrix that is not an identity matrix or a discrete Fourier matrix. Alternatively or in addition, the arbitrary transformation can be based on a matrix that is not a direct sum of discrete Fourier matrices.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The invention claimed is:

1. A method, comprising:
    selecting, via a processor of a communications system, a block size;
    identifying, via the processor, a set of constellation points associated with a constellation diagram, based on a plurality of bits, the constellation diagram associated with a modulation scheme;
    generating, via the processor, a plurality of symbol blocks based on the set of constellation points, each symbol block from the plurality of symbol blocks having a size equal to the block size and including a subset of constellation points from the set of constellation points;
    applying, via the processor, a unitary braid division multiplexing (UBDM) transformation to each symbol block from the plurality of symbol blocks to produce a plurality of complex numbers; and
    sending, via the processor, the plurality of complex numbers.

2. The method of claim 1, wherein the communications system is configured to perform at least one of Quadrature Amplitude Modulation (QAM), Amplitude Phase Shift Keying (APSK) modulation, or Orthogonal Frequency-Division Multiplexing.

3. The method of claim 1, wherein the communications system is a wireless communication system.

4. The method of claim 1, wherein the communications system is a wired communication system.

5. The method of claim 1, wherein the communications system is a fiber optic communication system.

6. The method of claim 1, wherein identifying the set of constellation points includes mapping the received plurality of bits to the constellation diagram.

7. The method of claim 1, wherein identifying the set of constellation points includes mapping the received plurality of bits to the constellation diagram using a gray code.

8. The method of claim 1, further comprising causing transmission of at least one signal representing the plurality of complex numbers using the modulation scheme.

9. A method, comprising:
    receiving, via a processor of a communications system, a plurality of input bits;
    converting, via the processor, the plurality of input bits into a plurality of complex numbers by: (1) performing bit-to-symbol mapping based on the plurality of input bits and data associated with a constellation diagram to produce a plurality of symbols, the constellation diagram associated with a modulation scheme, and (2) applying a unitary braid division multiplexing (UBDM) transformation to the plurality of symbols to produce the plurality of complex numbers; and sending the plurality of complex numbers, via the processor and using a predetermined modulation technique, for subsequent processing, the subsequent processing including performing the modulation scheme to transmit a signal including a representation of the complex numbers.

10. The method of claim 9, wherein the UBDM transformation includes a plurality of nonlinear layers and a plurality of linear layers.

11. The method of claim 9, wherein the predetermined modulation technique includes one of Quadrature Amplitude Modulation (QAM), Amplitude Phase Shift Keying (APSK) modulation, or Orthogonal Frequency-Division Multiplexing.

12. The method of claim 9, wherein the communications system is a wireless communication system.

13. The method of claim 9, wherein the communications system is a wired communication system.

14. The method of claim 9, wherein the communications system is a fiber optic communication system.

15. The method of claim 9, wherein the bit-to-symbol mapping is performed using a gray code.

16. The method of claim 9, wherein the subsequent processing includes at least one of pulse shaping or the application of at least one filter.

17. The method of claim 9, further comprising causing transmission of at least one signal representing the plurality of complex numbers using the modulation scheme.

18. A method for modulation-agnostic unitary braid division multiplexing (UBDM) signal transformation, the method including:
    receiving a plurality of input bits;
    mapping each input bit from the plurality of input bits using a bit-to-symbol map to identify a plurality of symbols;
    grouping subsets of symbols from the plurality of symbols into a plurality of blocks, each block from the plurality of blocks having a size N, where N is a natural number;
    applying a UBDM transformation to each block from the plurality of blocks to produce a plurality of complex numbers; and
    sending the resulting complex numbers.

19. The method of claim 18, wherein the sending the resulting complex numbers is to a downstream portion of the communication system for at least one of pulse shaping or filter application.

20. The method of claim 18, wherein the method does not include the application of an inverse Fourier transform prior to sending the complex numbers.

21. The method of claim 18, wherein the method does not include generating of spreading codes.

22. The method of claim 18, wherein the bit-to-symbol map is a constellation diagram for a signal to be transmitted wirelessly, or through wired or fiber optic communication.

* * * * *